United States Patent [19]

Schlesinger

[11] 4,079,237
[45] Mar. 14, 1978

[54] CARD CONTROLLED BETA BACKSCATTER THICKNESS MEASURING INSTRUMENT

[75] Inventor: Julius Schlesinger, Deer Park, N.Y.

[73] Assignee: Unit Process Assemblies, Inc., Syosset, N.Y.

[21] Appl. No.: 631,412

[22] Filed: Nov. 12, 1975

[51] Int. Cl.² .................. G06F 15/52; G01N 23/203
[52] U.S. Cl. .................................. 364/563; 235/492; 250/308; 364/527
[58] Field of Search ............. 235/61.12 C, 151.3, 235/151.32; 250/308; 340/172.5

[56] References Cited

U.S. PATENT DOCUMENTS

| | | | |
|---|---|---|---|
| 3,171,100 | 2/1965 | Rajchman | 235/61.12 C X |
| 3,332,071 | 7/1967 | Goldman et al. | 340/172.5 |
| 3,412,249 | 11/1968 | Hanken | 250/308 |
| 3,639,763 | 2/1972 | Streng | 250/308 |
| 3,742,217 | 6/1973 | Eakman et al. | 250/308 |
| 3,775,595 | 11/1973 | Rosse et al. | 235/151.35 X |
| 3,829,844 | 8/1974 | Zonneveld et al. | 340/172.5 |
| 3,854,042 | 12/1974 | Ott | 250/308 |

*Primary Examiner*—Jerry Smith
*Attorney, Agent, or Firm*—Robert E. Isner

[57] ABSTRACT

An improved beta backscatter instrument for the non-destructive measurement of the thickness of thin coatings on a substrate. Included therein is the utilization of a bank of memory stored data representative of isotope, substrate, coating material and thickness range characteristics in association with a control card having predetermined indicia thereon selectively representative of a particular isotope, substrate material, coating material and thickness range for conditioning electronic circuit means by memory stored data selected in accord with the predetermined indicia on a control card for converting backscattered beta particle counts into indicia of coating thickness.

2 Claims, 17 Drawing Figures

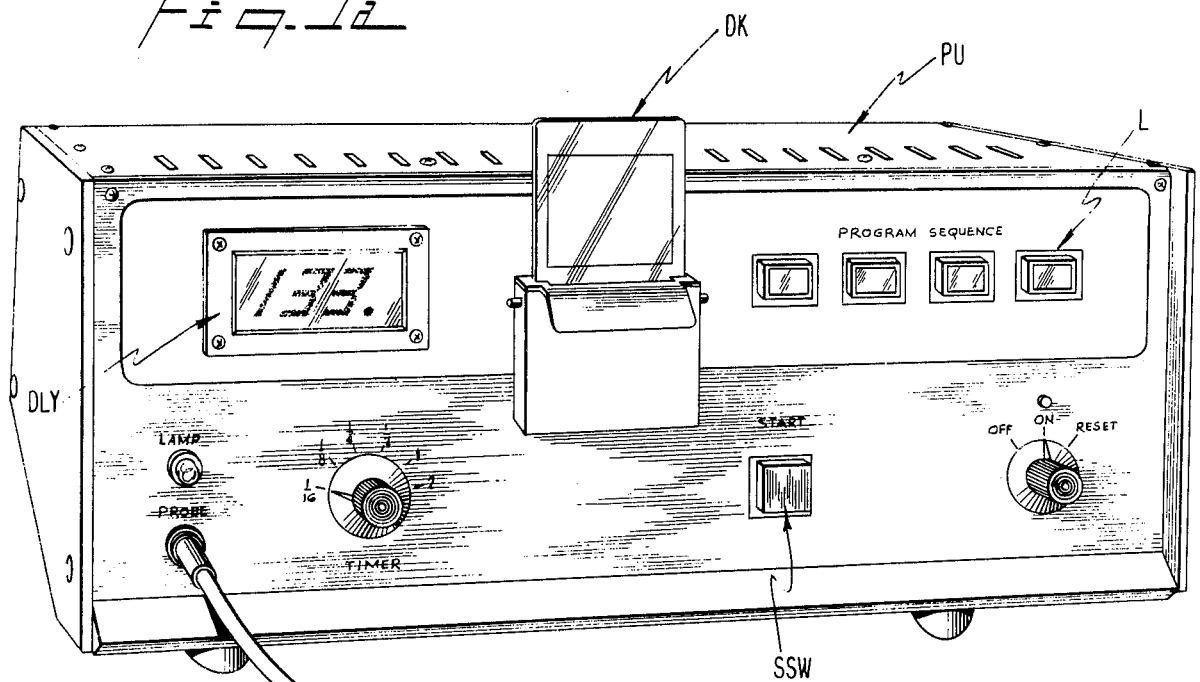
Fig. 1a
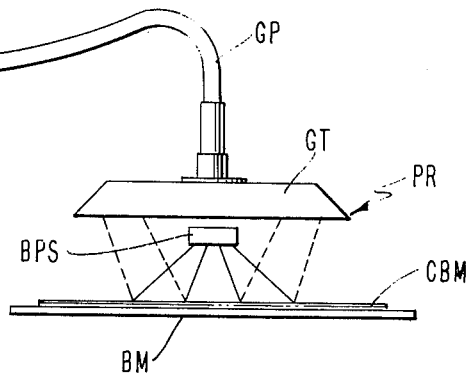
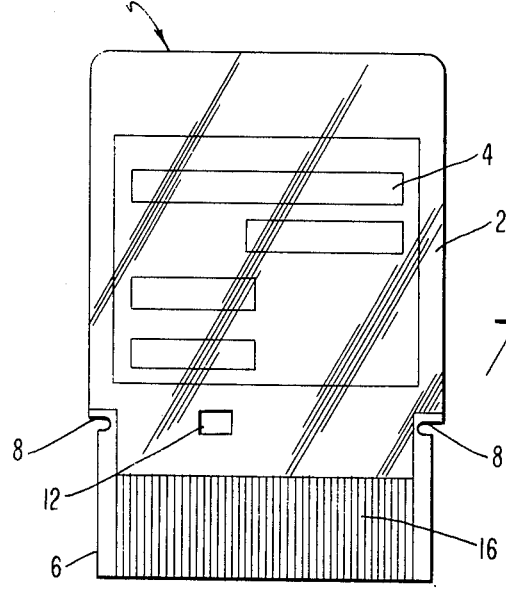
Fig. 1b

Fig. 3 CALCULATOR CAL

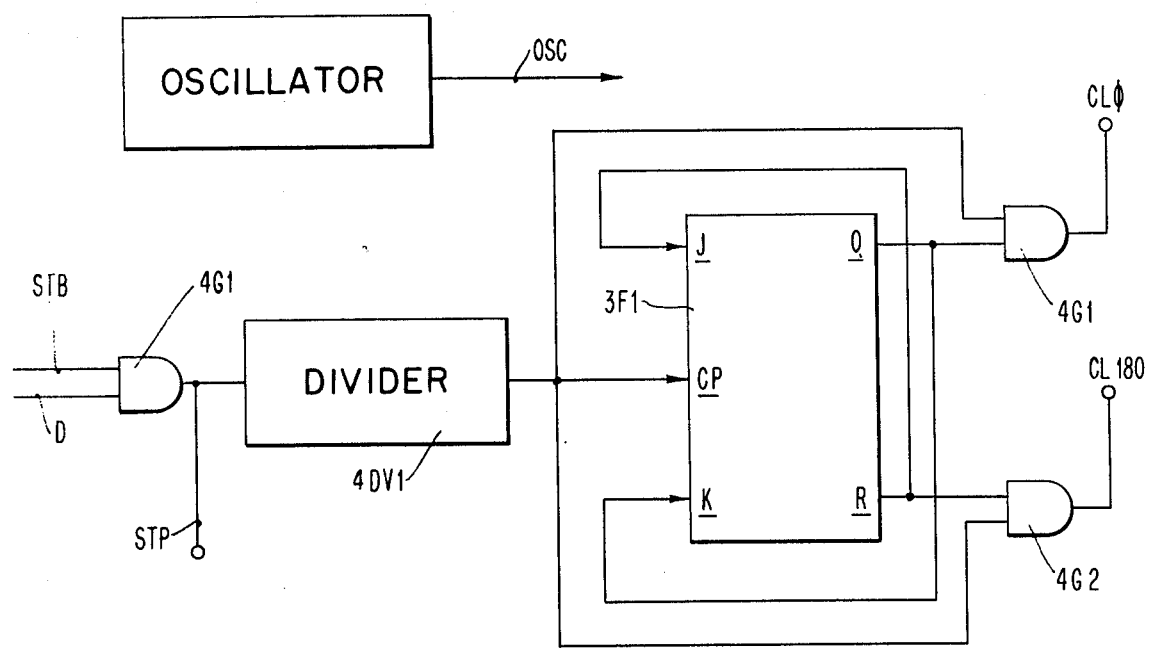
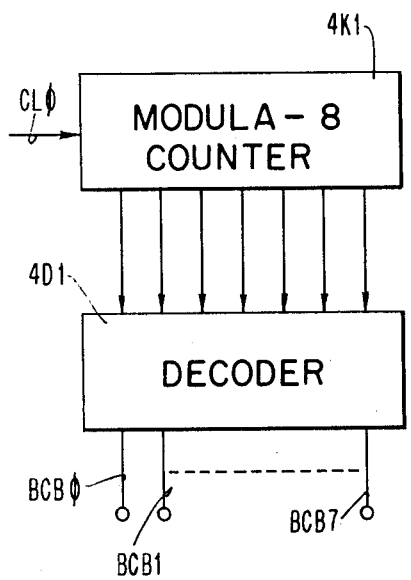
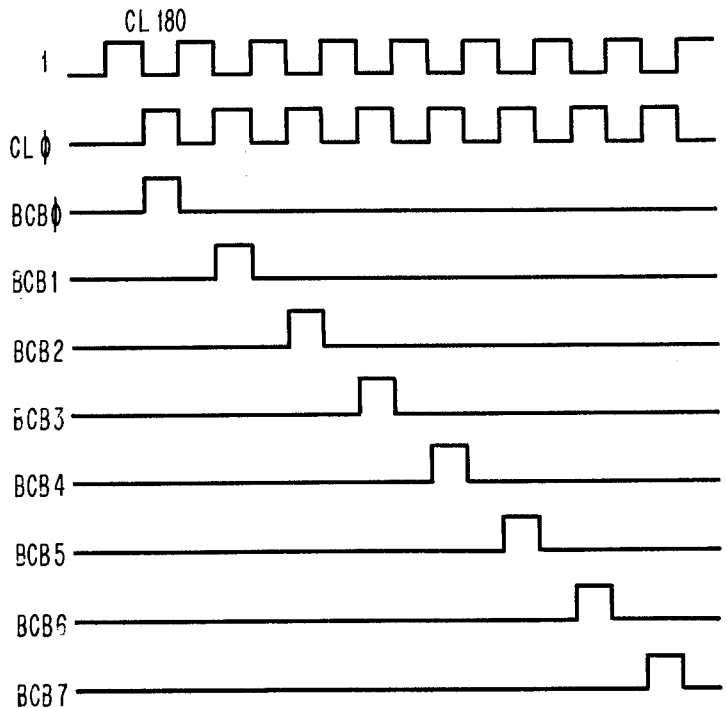
Fig. 4
CLOCK CLK

STATE SEQUENCER
SK

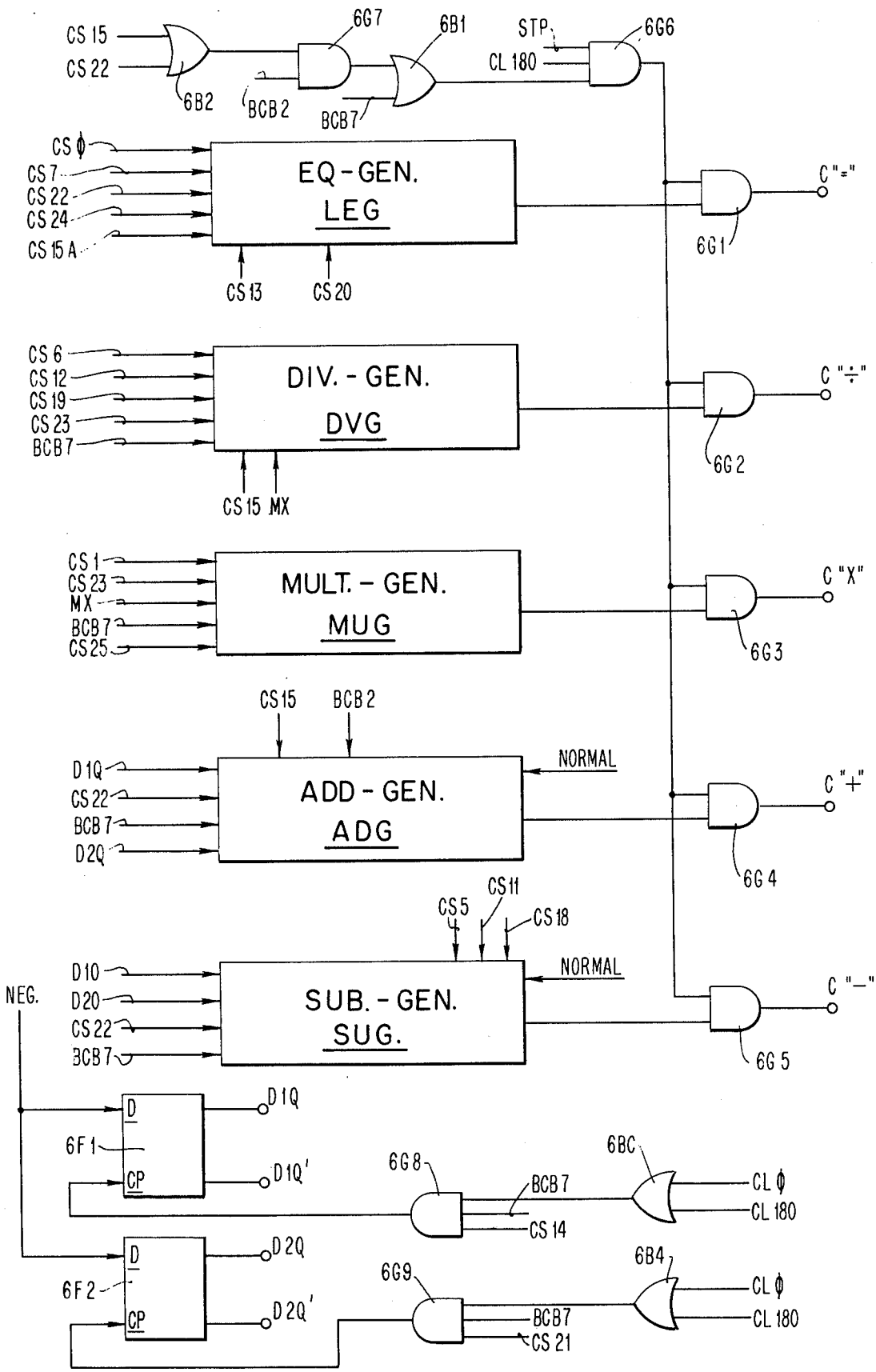

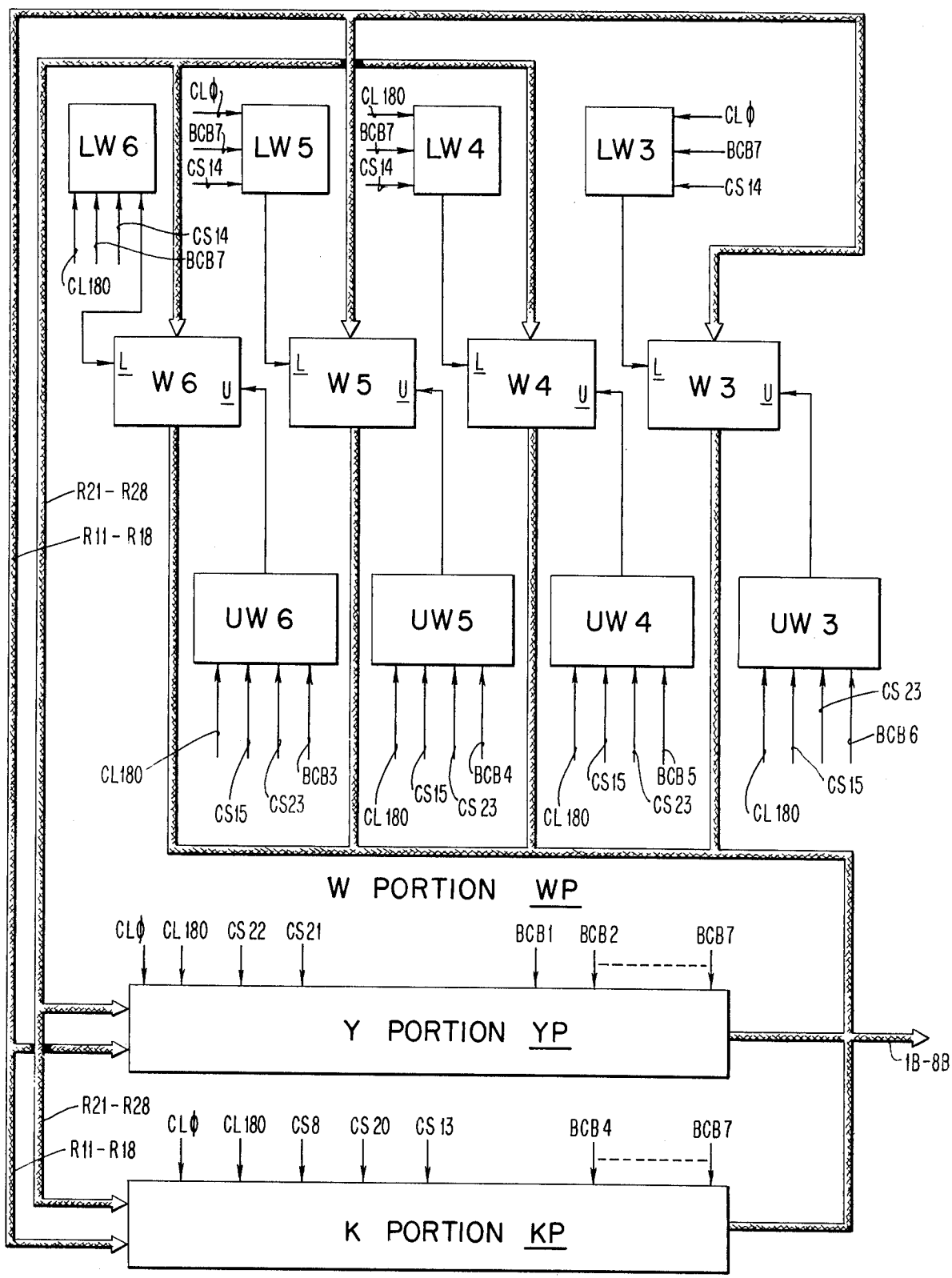
Fig. 7 WORKING REGISTERS WKR

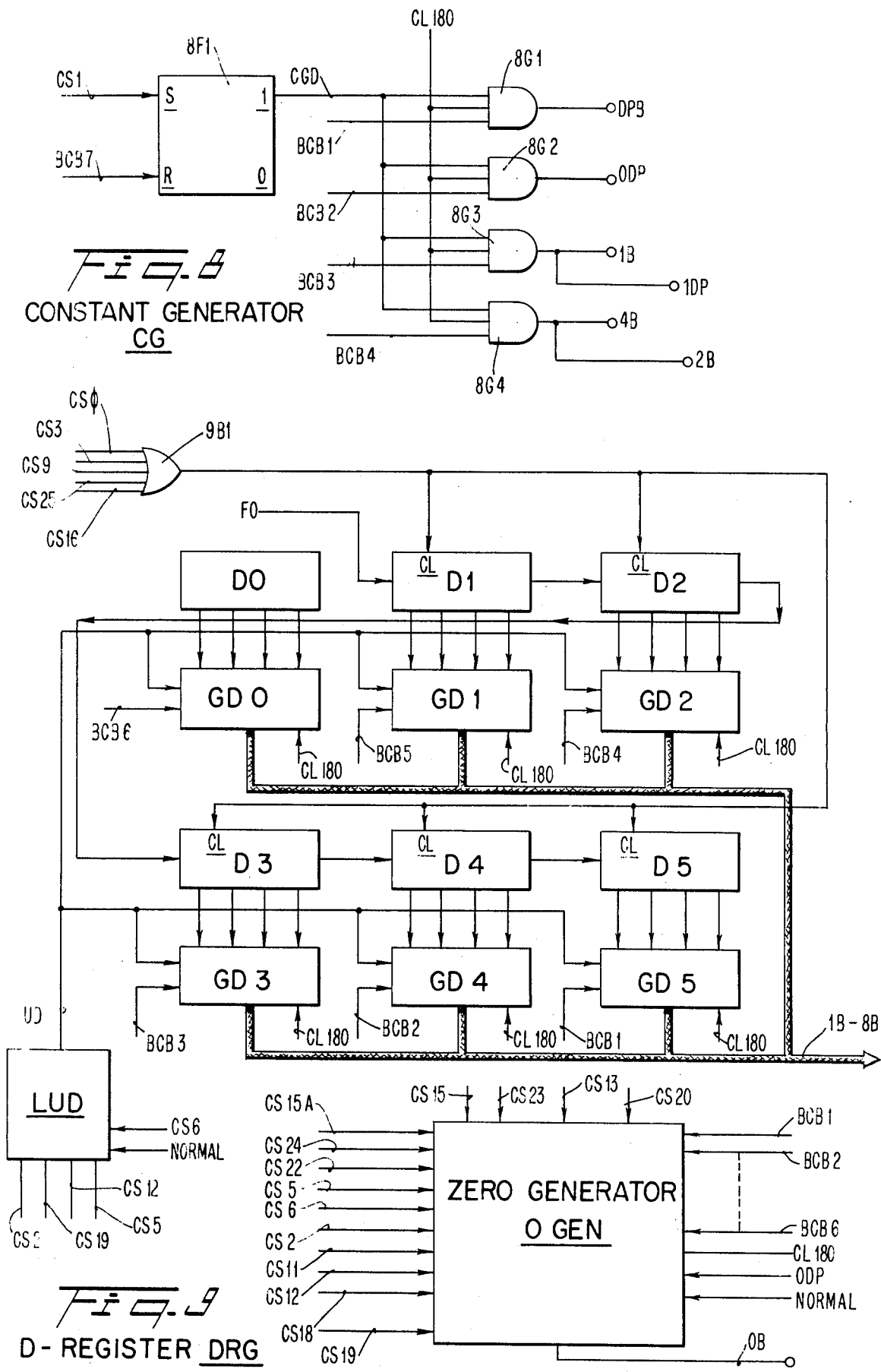

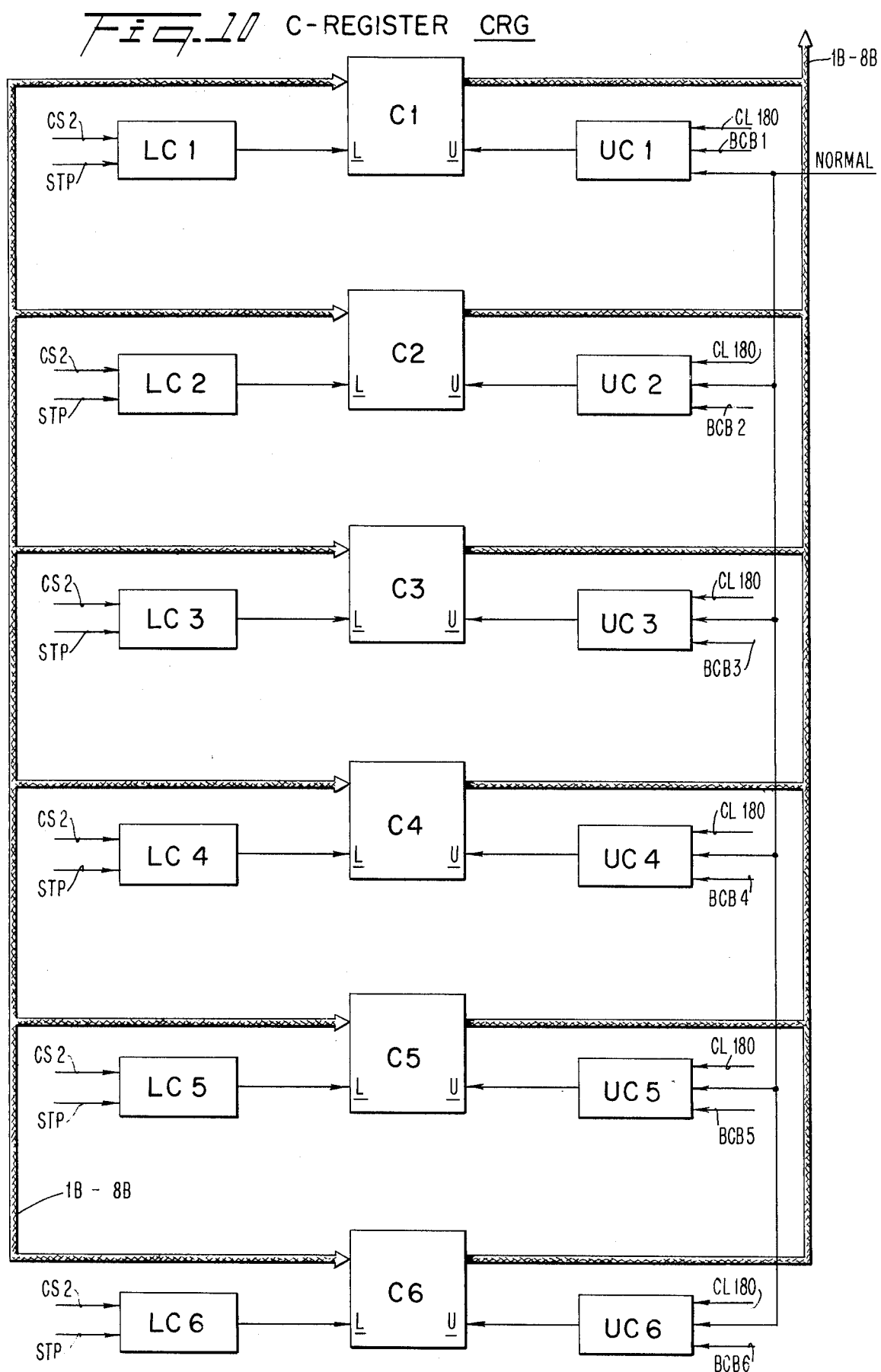
Fig. 10 C-REGISTER CRG

CARD READER
CDR

Fig. 12
DISPLAY DLY
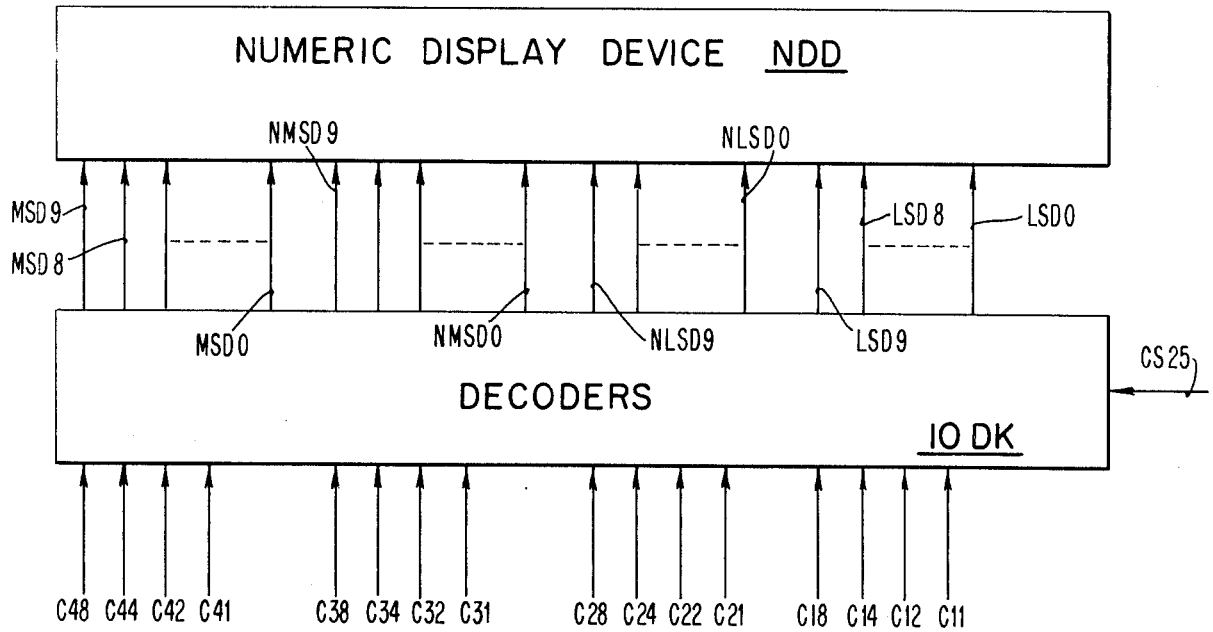
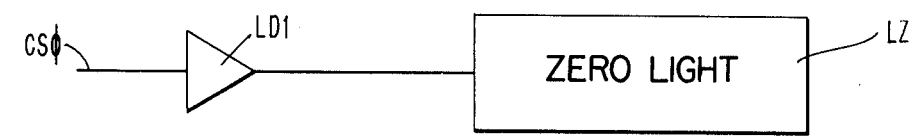
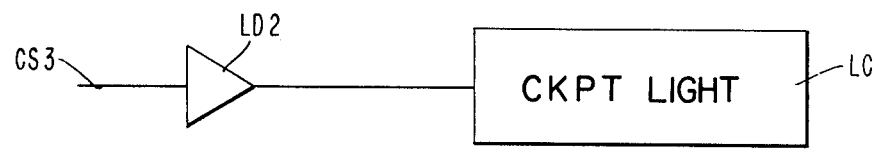
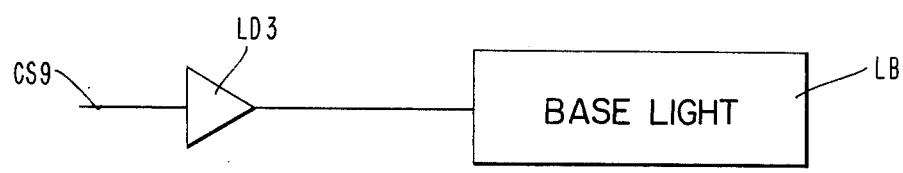
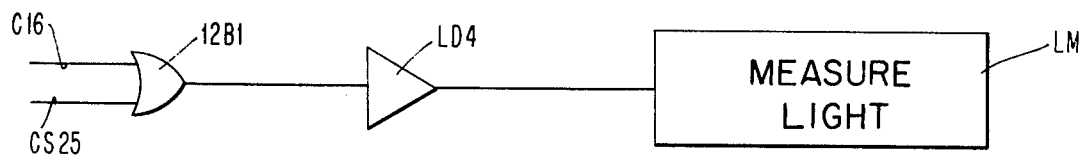

Fig. 13
ROM INPUT REGISTER RIG
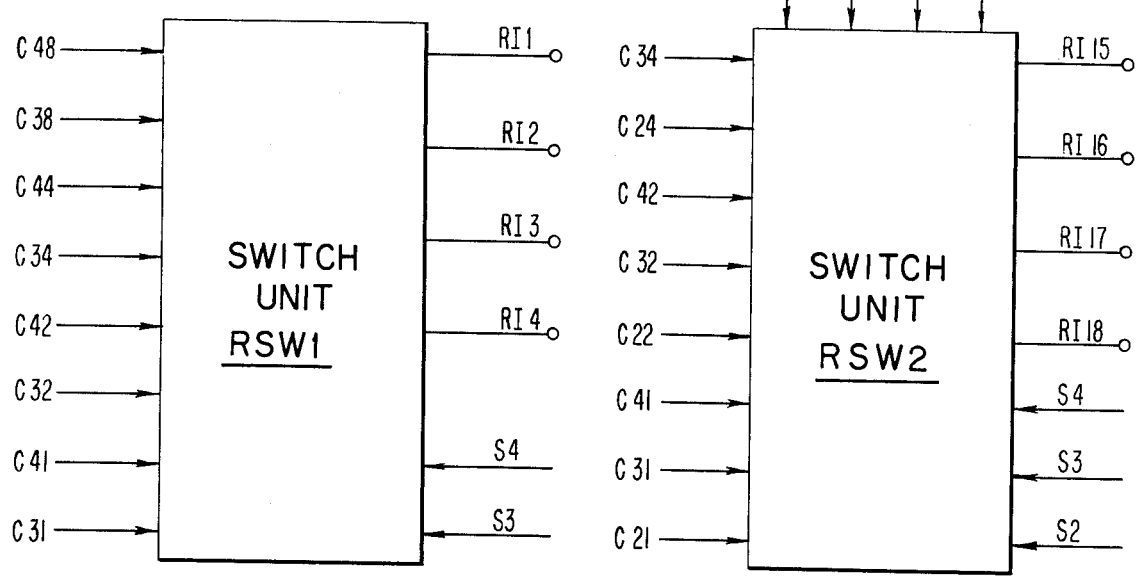
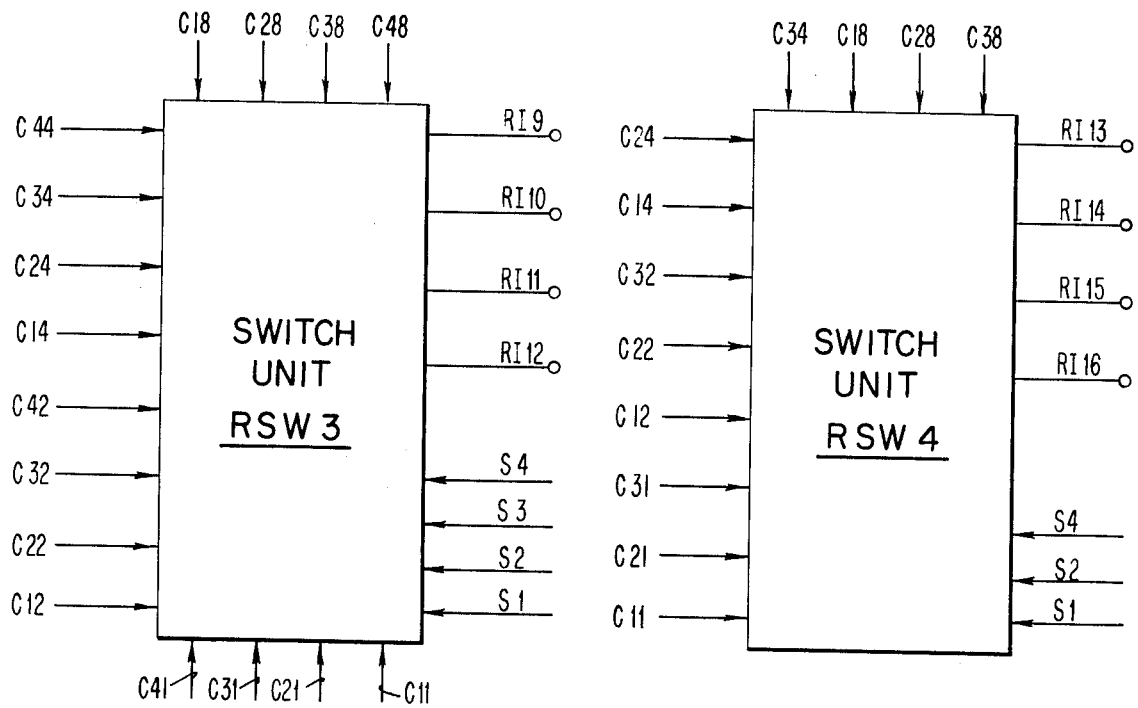
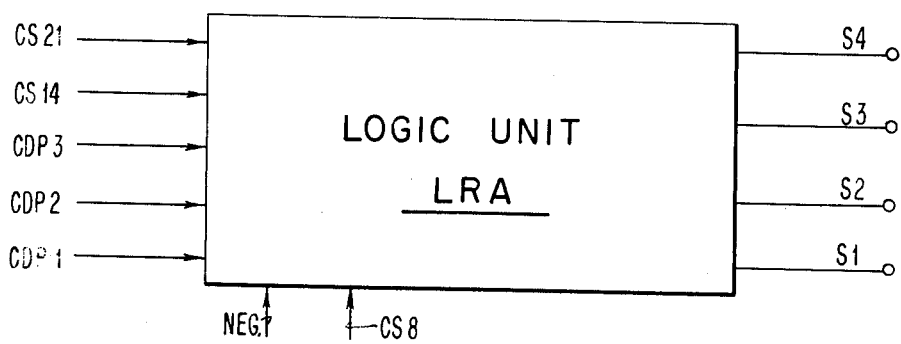

MEMORY ROM

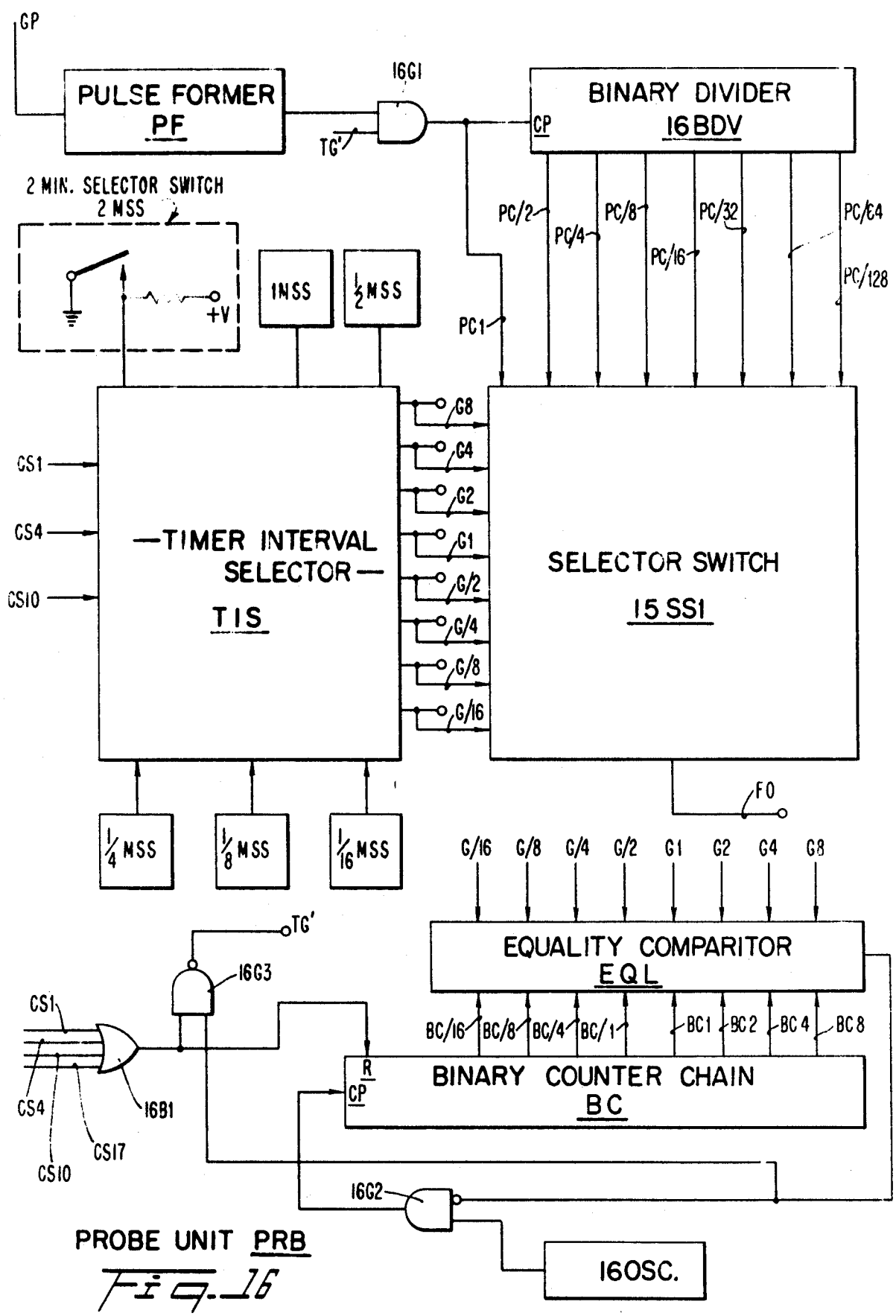

CARD CONTROLLED BETA BACKSCATTER THICKNESS MEASURING INSTRUMENT

This invention relates to beta backscatter thickness measuring instruments and particularly to a direct digital read-out, card controlled, automated instrument for the non-destructive measurement of thin coatings on substrates.

The non-destructive measurement of thin coatings on substrates by the use of beta backscatter techniques is well known and the basic techniques employed can be found in standard literature on the subject.

Beta ray emission from an isotope source is essentially a random phenomenon. Thickness measurements based upon beta ray backscatter from a workpiece conventionally involve, for a given radioactive source and for a preselected time interval, a comparison of counts backscattered from the workpiece undergoing measurement with the counts backscattered from known standards, both suitably compensated for environmental backscattering attendant the physical disposition of the source, detector and the surfaces exposed to the radiation.

As is well known, beta backscatter measuring instruments are particularly adapted to measure extremely thin films or coatings of one material deposited or disposed on the surface of another and different material and are operatively effective as long as the atomic numbers of the coating and base material are sufficiently different. Such measurements were made by a series of operations generally as follows: (a) make an initial background count for a predetermined time interval; (b) make a base count for a base material sample, utilizing the same time interval; (c) calculate the actual base count by subtracting the background count therefrom; (d) make a series of gross counts for a range of known standards incorporating the same base material and known coating thicknesses of the same coating material; (e) calculate the net counts by subtracting the base count from each gross count therefor; (f) plot a curve of either percent increase of counts versus coating thickness or of net counts versus coating thickness; and (g) test unknown specimens and either calculate coating thickness by comparisons of such counts with the counts for the standards, or locate unknown specimen thickness by means of the above curve.

Such operations were quite time consuming and U.S. Pat. No. 3,271,572 disclosed a system that was adapted to provide a direct indication of the magnitude of the parameter being measured to the end of permitting a more rigid sequential measurement of multiplicities of workpieces without calculation or computation and by relatively unskilled personnel. This application is a further improvement over the instrument disclosed in said U.S. Pat. No. 3,271,572.

This invention relates to an improved beta backscatter thickness measuring instrument that includes, in its broad aspects, a bank of memory stored data representative of isotope, substrate, coating material and thickness range characteristics, a control card having predetermined indicia thereon selectively representative of a particular isotope, particular substrate material, particular coating material and a particular thickness range and associated electronic solid state circuit means conditionable by memory stored data selected in accord with the predetermined indicia on a control card for converting back-scattered beta particle counts into indicia of coating thickness.

Among the advantages of the subject invention is the provision of an improved beta backscatter thickness measuring instrument capable of providing a direct digital representation of the thickness of the coating being measured without any interpretation or interpolation by the operator thereof. A further advantage of this invention is the permitted utilization of a control card or the like which, in association with an internal memory bank, automatically establishes all of the operating parameters necessary to accurate and automated operation.

The object of this invention is the provision of an improved translating device for beta backscatter thickness measuring instruments.

Other objects and advantages of the invention will be pointed out in the following disclosure and claims and will be illustrated in the accompanying drawings which delineate, by way of example, a presently preferred embodiment of the invention.

Referring to the drawings:

FIG. 1a shows an idealized and schematic view of the thickness measuring system including a probe and a processing unit;

FIG. 1b is a front elevation of a presently preferred construction for a control card incorporating the principles of this invention;

FIG. 4 is a block diagram of the clock CLK;

FIG. 6 is a block diagram of the function generator FNG;

FIG. 7 is a block diagram of the working registers WKR;

FIG. 8 is a block diagram of the constant generator CG;

FIG. 9 is a block diagram of the D-register DRG;

FIG. 10 is a block diagram of the C-register CRG;

FIG. 12 is a block diagram of the display DLY;

FIG. 13 is a block diagram of the ROM input register RIG;

FIG. 16 is a block diagram of the PROBE unit PRB, including the pulse forming, time interval selector and other units of the processor PU associated therewith.

Figure 2:
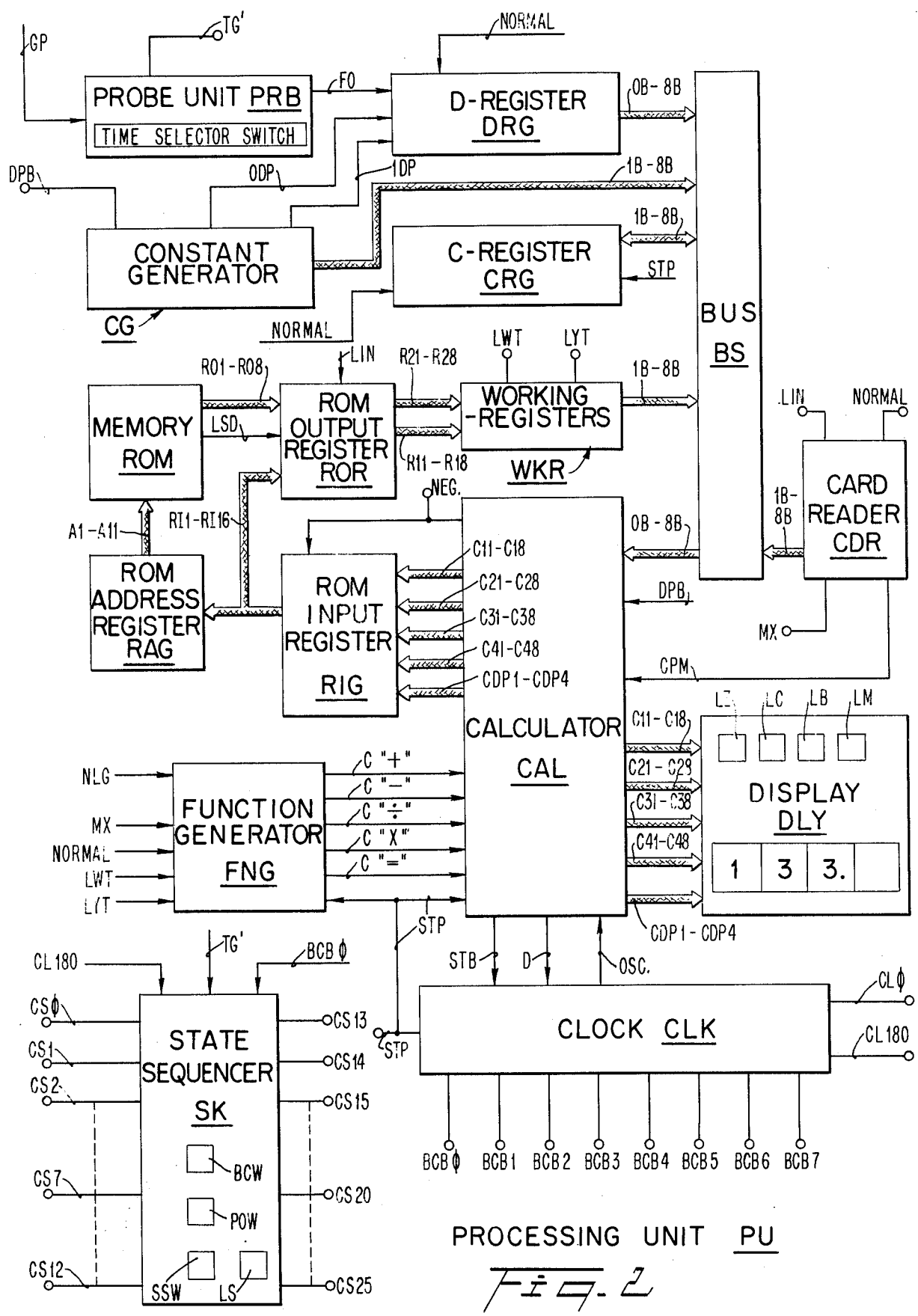
FIG. 2 is a block diagram of the processing unit PU.

By way of general background, the subject thickness measuring system uses beta-particles backscattered from the surface of the object being measured to determine coating thickness. These particles are emitted from a radioactive source located in a probe assembly. The backscattered beta-particles enter into the window of a Geiger tube in the probe which are then converted into electrical pulses for processing in a translating device. The translating device, which can also be called a processing unit, then counts the pulses received during a preset time interval and computes a direct digital readout of coating thickness.

Two basic principles govern the operation of the system. (1) The number of beta-particles backscattered from different materials varies as a function of their atomic number, with higher atomic-numbered materials backscattering more particles than the lower-numbered materials, and (2) as the thickness of the coating material increases, it backscatters more particles while reducing the number of the particles backscattered by the base material. The system uses these principles to measure unknown coating thicknesses.

In the illustrative operation of the system, a sample of the uncoated base material is placed on the probe. After a time interval, the system sets itself to read zero. A Thickness Standard (coated sample of known thickness) is then placed on the probe and a measurement is made for the same time interval. The instrument then calibrates itself, and stores the known coating thickness. After the instrument has thus been "standardized" it is ready to make direct thickness measurements of samples coated with unknown thicknesses of materials by utilizing the prior measurements.

Before describing the operation of the system, the steps of the measurement will be described.

1. Generate a C-number by counting the number of Beta-particles back scattered off a bare base standard; and the C-number is stored.
2. Generate a D-number by counting the number of Beta-particles back scattered off a coated standard, a base standard coated with a material of known thickness; and the D-number is stored.
3. Calculate a constant $$K = |(C - D)/Q|$$

where Q is a calibration constant stored in a data card DK peculiar to the combination of the coating material and the base material; the K number is stored.

4. Decide whether to correct the C-number to correspond to the actual base used in the coated items to be measured. Assume the answer is yes. If not then go to step 9.
5. Count the number of Beta-particles back scattered from the base material actually being used to form an E-number which is stored.
6. Perform the calculation $(C - E) \div K$ to give a base material thickness correction number $W_L$ which is stored.
7. Correct the $W_L$-number to a $W_T$-number depending on a universal non-linear back scattering curve.
8. Perform a second correction of the $W_T$-number depending on the particular combination of coating material and base material. This is the thickness correction, a W-number, which is stored. The calibration is finished and the measurement of a coated unknown sample can begin.
9. Count the number of Beta-particles back scattered from a coated base material whose coating thickness is to be determined; store as an F-number.
10. Calculate and store a nominal thickness representation of the coating or calibration number, i.e., $(C - F) \div K = Y_L$-number.
11. Again using the universal curve convert the $Y_L$-number or calibration number to a $Y_T$-number or multiplied thickness number and store.
12. Recorrected the $Y_T$-number by a signed multiplier also stored in a data card DK to give a Y-number or indicia of actual coating thickness.
13. Correct the thickness to give true thickness; i.e. perform calculation $\pm Y \pm W$ = true thickness.

In the description of the thickness measuring system the following conventions will be employed:

1. Each signal has a reference character equal to the signal designation, i.e., the CS2 signal line carries the CS2 signal;
2. Positive logic will be employed. Thus, when a signal is present, it is "high" and equivalent to logical 1 or +, while at the same time its inverse is "low" and equivalent to logical 0 or −. When a signal is absent it is low and its inverse high. Signals will be designated by unprimed reference characters while their inverses will be represented by primed reference characters.
3. Generally the signal lines for the direct signals are shown in the system diagram even though there may also be a signal line for the inverse signal.
4. Also, throughout the description the terminology "digit" will be used to indicate a coded combination of bits or signals representing a decimal digit.
5. When the expression such as "a digit is transferred" is used, it should be realized that actually the coded combination of signals or bits forming the digit are transferred.
6. Digits are transferred serially with the bits of the digits transferred in parallel over a plurality of lines. For example, digits are transferred through the bus — BS on five parallel lines, each carrying one bit of the digits. Instead of showing five lines, the lines are merged into a cable indicated by a reference character OB–8B implying five lines 0B, 1B, 2B, 4B and 8B. Note lines 1B, 2B, 4B and 8B carry the binary weights of the number; line 0B carries a zero weight.
7. There are many timing signals such as CL$\phi$, CL180 and BCB$\phi$ to BCB7, and state indicating signals such as CS$\phi$ to CS25 used through the system. However, for the sake of clarity their signal lines will not generally be shown in FIG. 1a but will be shown in the Figures associated with the detailed description of the blocks.

In FIG. 1a there is shown the basic components of a thickness measuring system comprising a probe PR having a source of Beta-particles BPS irradiating a base material BM with a coating to be measured CBM which backscatters the Beta-particles to a Geiger tube unit GT. The Geiger tube GT unit may include electronics for amplifying and shaping so as to emit pulses on line GP to the processing unit PU which, by means of information supplied from a data card DK, displays thickness as decimal digits on display DLY. The processing unit PU indicates the stages of the processing by means of lamps in the lamp bank L and is stepped through certain cycles by illuminatable start or sequence switch SSW.

In such an instrument, a selectively constituted control card, generally designated DK and illustrated in elevation in FIG. 1b, is adapted to contain predetermined indicia that is selectively representative of a particular beta radiation emitting isotope, a particular base material, a particular coating material and a measurable thickness range for the latter for selecting particular data or intelligence from a memory bank of stored data and for calibrating and/or conditioning the solid state electronic circuitry in the processing unit PU all to the end of automatically converting backscattered beta particle counts into a direct digital indication of coating thickness.

While such control card may be of any suitable configuration and the intelligence embodied therein may take varying forms such as perforations, magnetic spots or the like, the presently preferred embodiment includes interruptable strips of metal plating and of a configuration to cooperatively function with the card reader assembly disclosed in copending application Ser. No. 631,376 filed Nov. 12, 1975.

As illustrated, such card includes a rectangular upper portion 2 having suitable identifying indicia 4 as to isotope, substrate and coating material and thickness range set forth thereon, a lower portion 6 of reduced transverse dimension and a pair of locking notches 8 disposed therebetween. In the illustrated card, the lower portion 6 includes the necessary control data in the form of interruptable strips 16 conductive plating material thereon. Also desirably included in the control card DK is a positioning aperture 12.

The processing unit PU shown in FIG. 2 comprises: a probe unit generally designated PRB which may include counters for generating selectable time intervals for gating the electric pulse from the Geiger tube, further divided, for a selected time interval, indicated by a signal on the TG line, to the line FO; a D-Register DRG which counts the pulses from probe unit PRB and converts them to numbers which are transferred onto cable 0B to 8B of bus BS; a constant generator CG which generates signals on lines representing a constant having the value 0.016 whose significance will hereinafter become apparent; a set of working registers WKR connected to bus BS; a C-Register CRG which receives for temporary storage numbers from D-Register DRG via bus BS and transfers them back onto the lines 1B to 8B; a set of working registers for temporarily storing intermediate values received on lines R11 – 18 and R21 – R28, and, when directed, transfers these values onto lines 1B to 8B; a read-only memory ROM which is basically a function table for converting input values of backscattering to corrected output values of backscattering, the output values are stored in registers addressed by signals on lines A1 to A11 and the output values are transferred onto lines R01-R08 to ROM output register ROR; Register ROR transfers values received from either lines R01-R08 or RI1-RI16 to lines R21-R28 and R11-R18; a ROM address generator RAG which translates the signals on lines RI1-RI16 to addresses fed out on lines A1 to A11; a ROM input register RIG which temporarily stores numbers received on lines C11-C18, . . . , C41-C48, and CDP1-CDP4 from calculator CAL; a function generator FNG which generates signals transmitted on lines C"+", C"−", C"÷", C"×" and C"=" to calculator CAL; calculator CAL arithmetically operates on numbers received from lines 0B to 8B in response to signals on lines C"+", C"−", C"±", C"×" and C"=" and transmits results on lines C11-C18, . . . , C41-C48, and CDP1-CDP4 to register RIG as well as to display DLY, calculator CAL also emits pulses periodically on lines STB and D in response to pulses received on line OSC; a display DLY which receives numbers from calculator CAL on lines C11-C18, C21-C28, . . . , C41-C48 and COP1-COP4 and visually displays such numbers; a clock CLK which transmits high frequency pulses on line OSC to the calculator CAL to provide its timing and receives from it strobe pulses on line STB and mode signals on line D to generate input strobe pulses on lines STP, two phases of clock signals on lines CL$\phi$ and CL180, and minor cycle timing pulses on lines BCB$\phi$ to BCB7; a state sequencer SK which counts the signals on line BCB$\phi$ to generate the signals on lines CS1 to CS25 representing the sequential states of the system; and a card reader CDR which reads data stored on the data card DK associated with the particular measuring routine to be performed.

Initially a data card DK containing the values needed for the specific measurement to be performed, say, gold on nickel with a standard thickness of 210 millionths inch and not over 340 millionths inch is to be measured.

A power on switch POW in state sequencer SK is turned on to clear the system, causing the state sequencer SK to go into state CS$\phi$ generating CS$\phi$ signal which clears the D-register DRG and the calculator CAL and lights the ZERO light LZ in display DLY. The operator selects the time measuring interval by activating the appropriate switch in probe PRB, say one-half a minute. The operator also places a base standard on the probe PR (FIG. 1) for measurement. For the example cited it will be nickle. The operator then pushes start switch SSW in the state sequencer SK causing it to generate the signal on line CS 1 associated with state CS1.

During state CS1 the ZERO light LZ goes off and the SEQUENCE light LS is light and the probe PRB passes beta pulses for four times $\frac{1}{2}$ minute via line FO to the D-register DRG where they are counted to form six binary-coded decimal digits. The number 0.016 is generated by constant generator CG and fed via bus BS to the calculator CAL. Then function generator FNG transmits the C"×" signal to the calculator CAL. At the end of the time interval, the signal on line TG' from the probe PRB to state sequencer SK goes high causing the sequencer to step to state CS2.

During state CS2, the six decimal digits in D-register DRG are loaded via bus BS into C-register CRG and also into the calculator CAL. Then the function generator FNG transmits a signal on line C"=" to the calculator CAL causing it to perform the arithmetic operation D × 0.016 =, representing the counts per minute registered by the probe PR. Then, at the next BCB$\phi$ pulse the state sequencer SK steps to state CS3.

During state CS3 the D-register DRG is again cleared, the CKPT light in display DLY is light and the sequence light goes off. The operator now replaces the base standard with a check point standard, i.e., a sample with 210 millionth inch of gold on a nickle base. The operator again pushes the start button causing the state sequencer SK to step to state CS4.

During state CS4 probe unit PRB passes beta pulses for four times $\frac{1}{2}$ minute via line FO to D-register DRG where they are counted to form six binary-coded decimal digits. The sequence light LS goes on. The termination of the TG' signal from probe unit PRB along with the next occurring BCB$\phi$ signal steps the state sequencer SK to state CS5.

In state CS5 data card DK will indicate whether the layer/substrate combination is normal having a positive coefficient of thickness or reverse having a negative coefficient of thickness. If normal then, the contents of D-register DRG are fed to the calculator CAL (otherwise the contents of C-register CRG) followed by the entry of the signal C"−" from function generator FNG. The state sequencer SK then steps to state CS6.

During state CS6 either the contents of D-register DRG or C-register CRG are fed to the calculator CAL (depending on which was entered in state CS5) followed by the entry into the calculator CAL of the signal C"÷" from function generator FNG. The state sequencer SK then steps to state CS7.

During state CS7 a three digit calibration constant (Q) on data card DK is entered into the calculator CAL by the card reader CDR followed by the entry of signal C"=" from function generator FNG. The calculator then performs the calculation:

$$K = (C - D)/Q \text{ or } (D - C)/Q.$$

The state sequencer SK steps to state CS8.

During state CS8 the constant or K-number that was calculated is transferred from the calculator CAL, via the ROM input register RIG and the ROM output register ROR to working registers WKR. The state sequencer SK then steps now to state CS9. The system now has the option of performing a base correction or not to accommodate possible difference between the nickle base to be used in later unknown measurements and the nickle base used in the check point measurement. If a base correction is to be performed as indicated by the position of a base correction switch BCW in state sequencer SK the counter goes to state CS9 otherwise to state CS16.

In state CS9, the sequence light LS goes off and the base light LB goes on in display DLY, and the D-register DRG is cleared. The operator replaces the check point standard on the probe PR with user base material. When he then pushes the start switch SSW, the state sequencer SK steps to state CS10.

In state CS10 the sequence light goes on and the base light goes off. The probe unit PRB will again transmit pulses of line FO to D-register DRG which stores a six decimal digit number (E). At the coincidence of the end of TG' and BCBφ signals, the state sequencer SK then steps to state CS11.

In state CS11, the contents of C-register CRG are fed to the calculator CAL followed by signal C"−" from function generator FNG. Then the state sequencer SK steps to state CS12.

In state CS12 the contents of D-register DRG are fed to the calculator CAL followed by the signal C"÷" from function generator FNG. The counter then steps to state CS13.

In state CS13, the three digit K value is transferred from the working registers WKR to the calculator CAL followed the entry from function generator FNG of the signal C"=". The calculator performs the calculation:

$$W_L = (C - E)/K$$

The state sequencer SK now steps to state CS14.

In state CS14, the $W_L$ value is loaded into the ROM input register RIG from the calculator CAL and from there to the ROM address generator RAG which causes the memory ROM to transfer a converted number $W_T$, via ROM output register ROR to the working registers WKR. The state sequencer SK then steps to state CS15.

In state CS15 there is the start of a further correction made for the types of metal used. In effect the $W_L$-number now stored in the working registers WKR is multiplied by a signed constant obtained from the data card DK. The sign of the constant is on the NORMAL line from the card reader CDR and is fed to function generator FNG. The value of the constant is stored on the data card along with indicia indicating whether the constant is a fraction or a whole number. If, a whole number, the card reader CDR will transmit a signal on line MX to function generator FNG. Thus, during state CS15 a zero is fed from D-register DRG via bus BS to the calculator CAL, followed by either the C"+" or C"−" signal, followed by the value of $W_L$ from the working registers WKR, followed by the signal C"×" or C"÷". The state sequencer now steps to state CS15A.

In step CS15A the four digit constant from the card reader CDR is fed to the calculator CAL followed by the signal C"=" from the function generator FNG. The state sequencer SK now steps to state CS16.

State CS16, is the last step of the calibration cycle of the system. In this state D-register DRG is cleared, the sequence light goes off and the measure light LM in the display DLY is light indicating the start of the first measurement cycle.

The operator sets the measuring interval in probe unit PRB or keeps the setting of the old measuring interval. If the old setting is kept the interval will be only one quarter of what it was up until now. The operator then places the unknown sample on the probe PR and pushes the start button SSW starting state CS17. Pulses from probe unit PRB are fed, via line FO, to and counted by the D-register DRG which forms a six decimal digit number. The dropping of the level of the signal on line TG' and the next occurrence of the timing signal BCBφ cause the state sequencer SK to step to state CS18.

In state CS18 the contents (C) of C-register CRG are fed to the calculator CAL followed by the signal C"−" from function generator FNG. The state sequencer SK now steps to state CS19.

In state CS19 the contents (F) of D-register DRG are fed to calculator CAL followed by the signal C"÷" from function generator FNG. The state sequencer SK now steps to state CS20.

In state CS20 the K-value stored in the working registers WKR is transferred to the calculator CAL followed by the signal C"=" from the function generator FNG. The calculator CAL performs the calculation $$Y_L = (C - F)/K$$

The system steps to state CS21.

In state CS21 the results of the multiplication ($Y_T$) are fed from the calculator CAL are fed via ROM input register RIG and ROM output register ROR to the working registers WKR. The step sequencer SK now steps to state CS22.

In state CS22, the digit zero is fed from D-register DRG to the calculator CAL, followed by a signal on line C"+" or C"−" depending on whether the material combination is normal or not indicated by a signal on line NORMAL from the card reader CDR, followed by the Y-contents of working registers WKR, followed by a signal on line C"+" or C"−" depending on the sign of the $W_T$-number. The state sequencer SK now steps to state CS23.

In state CS23, the $W_T$-number is transferred from the working registers WKR to the calculator CAL, followed by a signal on line C"×" or C"÷" from function generator FNG as indicated by the presence or absence of the MX signal on card reader CDR. The state sequencer SK now steps to state CS24.

In state CS24, the multipler number (MULT) from the card reader CDR is fed to the calculator CAL followed by a signal on line C"=" from function generator FNG. The calculation performed is $$(\pm Y_T \pm W_T) \div \text{ or } \times \text{ MULT} = \text{THICKNESS}$$

The state sequencer SK now steps to state CS25.

In state CS25 the results of the calculation are fed via lines C11-C18, . . . , C41-C48, CDP1-CDP4 to the display DLY which displays the thickness. The sequence light goes off and the measure light LM goes on in the display DLY indicating a new sample can be measured. The sequence is repeated from the end of state CS16.

Figure 3:
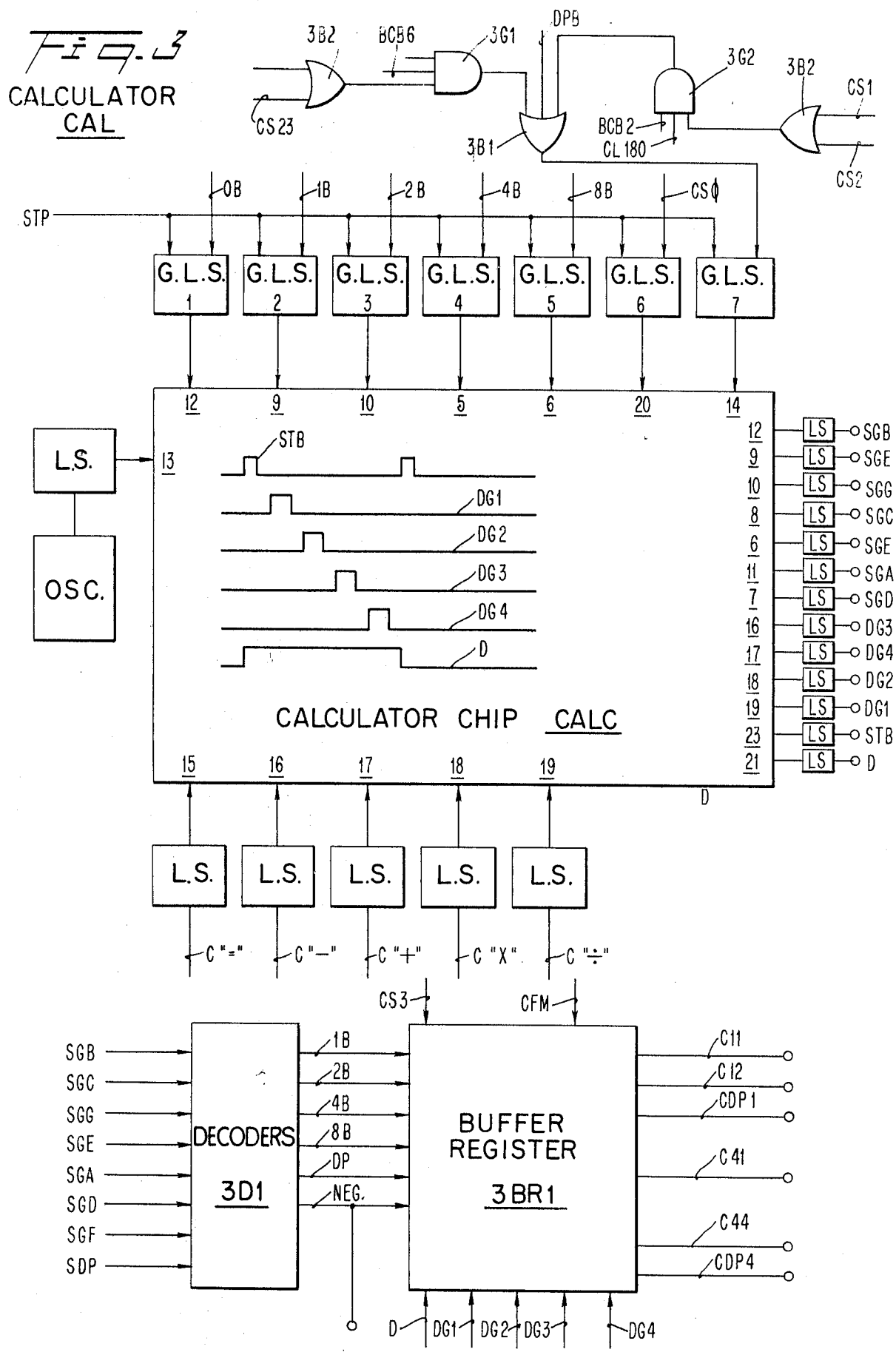
FIG. 3 is a logic diagram of the calculator CAL.

FIG. 3 is a block diagram of the calculator CAL which centers around the calculator chip CALC. The chip can be a device made by General Transistor having the model number C500. The numbers within the block are the actual pin numbers of the chip and all signal leads are connected to these pins as shown. However, the connection of the operating voltages is not shown. Because the chip operates at different voltage levels than the remainder of the processing unit PU there are conventional level shifters LS which act as interfaces.

The calculator chip CALC receives 140 KHz pulses on line OSC which act as its internal clock. In response thereto the calculator CAL emits the timing signals shown within the block CALC.

The calculator chip CALC is initially cleared in state CS$\phi$ by the coincidence of a pulse on line STP and the signal on line CS$\phi$ into the gated level shifter GLS6. This gated level shifter and all other such gated level shifters GSN comprise a two input AND-circuit having inputs to receive the input variables and an output connected to the input of a conventional level shifter whose output is connected to a calculator-chip pin.

Signals representing decimal digits on lines 0B to 8B are gated in under control of a pulse on line STP. Note the signals on lines 1B to 8B represent BCD digits, and the signal on line 0B must be present, but it has a weight of zero. Decimal points are entered via OR-circuit 3B1 from line DPB, or from the combination of AND-circuit 3G1 and OR-circuit 3B2, or from the combination of AND-circuit 3G2 and OR-circuit 3B2.

The functions of addition, subtraction, multiplication and division are performed by the calculator chip in response to signals of lines C"−", C"+", C"÷" and C"×". Multiplication or division is initiated by a signal on line C"=" after the entry of the operands and the operator function. The results of the calculation are emitted, digits serially, in a segment code form on lines SGA to SGF.

These signals are decoded by decoder 3D1 to BCD form and transferred to a four-digit buffer register 3BR1, to convert the digits from serial to parallel. Therefore, each digit from the decoder is loaded into a different digit position under control of the D signal and the DGN signals. Each of the four possible digits and its decimal point if present is then represented by signals on lines C11 to CDP4 For example, the least significant digit generated as the result an arithmetic operation is present on lines C11, C12, C13, and C14 and if it has a decimal point it will be on line CDP1.

The clock CLK as shown in FIG. 4 comprises the 140 KHz osillator for emitting pulses on line OSC to the calculator CAL which in response thereto emits signals on lines STB and D, connected to AND-circuit 4G1 which passes only those STB pulses occurring in coincidence with the D signal to become to signals on line STP. This signal is divided by divider 4DV1 merely to slow up the external operation and then binary counted by the combination of J-K flip-flop 3F1 and the AND-circuits 4G1 and 4G2 to give the CL$\phi$ and CL180 signals.

The CL$\phi$ signals are fed to modulo-8 counter 4K1 whose outputs are fed to decoder 4D1 to generate the signals on lines BCB$\phi$ to BCB7. All the signals generated by the clock CLK are shown in the Figure.

Figure 5:
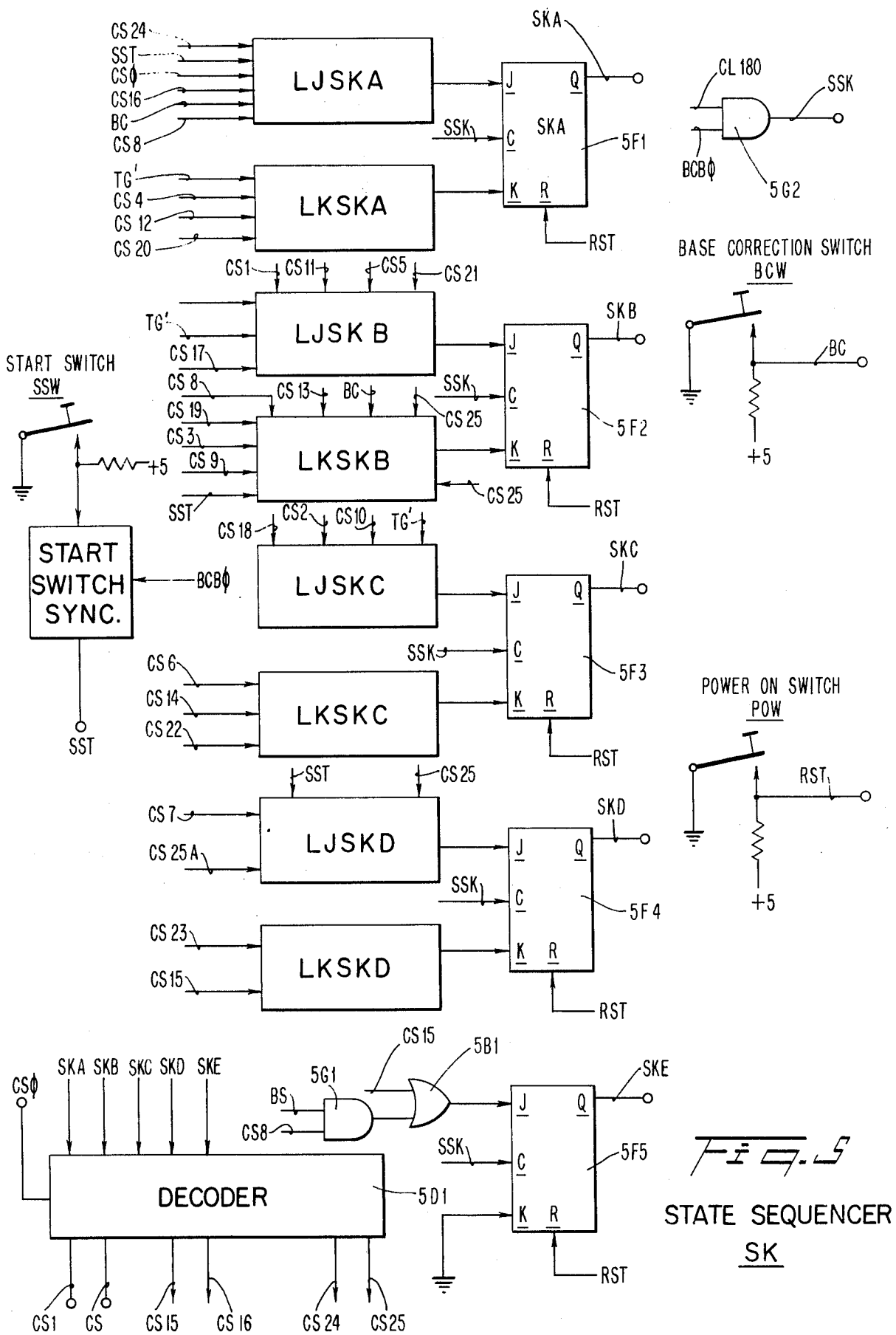
FIG. 5 is a block diagram of the state sequencer SK.

The state sequencer SK of FIG. 5 centers around five J-K flip-flops 5F1 to 5F5 whose outputs feed a decoder 5D1 to generate the signals on lines CS$\phi$, CS1, . . . , CS14, CS15, CS15A, CS16, . . . , CS25. There may also be generated the inverses of some of these signals. However they are not shown merely to simplify the drawings.

There are several switches in the unit. The power-on switch POW when closed generates a signal on line RST which initializes all the flip-flops. The base correction switch BCW when closed generates a signal on line BC which causes the bypassing of several of the states. The start switch SSW is closed and opened several times during the operation to generate further steps in the sequence. Each time it is closed the start switch synchronizer emits a single pulse on line SST in time with signal BCB$\phi$.

The flip-flop 5F5 has its K-input connected to ground and its J-input connected to the output of OR-circuit 5B1 whose first input is connected to the CS15 signal line and whose second input is connected to the output of AND-circuit 5G1 whose inputs are connected to lines BS and CS8. Note the combination of the OR-circuit 5B1 and 5G1 are a logic unit which can be represented by the logic equation:

$$J = CS15 + (BS \cdot CS8)$$

where the "·" represents the and-function of the AND-circuit and the "+" represents the or-function of the OR-circuit.

In order to simplify the drawing and not show innumerable AND-circuits and OR-circuits the inputs of the remaining flip-flops will be shown as logic units and their logic equations will be stated.

The J input of flip-flop 5F1 is connected to logic input LJSKA satisfying the logic equation:

$$LJSKA = (CS8 \cdot BC) + (CS16 \cdot SST) + (CS\phi \cdot SST) + CS24.$$

The K-input of flip-flop 5F1 is connected to logic unit LKSKA satisfying the logic equation:

$$LKSKA = (CS20) + (CS4 \cdot TG') + (CS12)$$

The J-input of flip-flop 5F2 is connected to logic unit LJSKB satisfying the logic equation:

$$LJSKB = (CS21) + (TG' \cdot CS17) + CS5 + CS11 + (CS1 \cdot TG')$$

The K-input of flip-flop 5F2 is connected to logic unit LKSKB satisfying the logic equation:

$$LKSKB = (BC \cdot CS8) + CS13 + CS19 + (SST \cdot CS9) + (SST \cdot CS3) + (SST \cdot CS25)$$

The J-input of flip-flop 5F3 is connected to logic unit LJSKC satisfying the logic equation:

$$LJSKC = CS18 + CS2 + (CS10 \cdot TG')$$

The K-input of flip-flop 5F3 is connected to logic unit LKSKC satisfying the following logic equation:

$$LKSKC = CS22 + CS14 + CS6.$$

The J-input of flip-flop 5F4 is connected to logic unit LJSKD satisfying the following logic equation:

$$LJSKD = (SST \cdot CS25) + CS7 + CS15A.$$

The K-input of flip-flop 5F4 is connected to logic unit LKSKD satisfying the following logic equation:

$$LKSKD = CS23 + CS15.$$

The C-input to all the flip-flops is the SSK signal generated by AND-circuit 5G2 which receives the CL180 and BCBϕ signals.

The function generator FNG shown in FIG. 6 centers around AND-circuits 6G1 to 6G5 which generates the function control signals. Each of the AND-circuits has one input connected to the output of AND-circuit 6G6 having inputs connected to lines STP and CL180 and the output of OR-circuit 6B1. The inputs of OR-circuit 6B1 are the line BCB7 and the output of AND-circuit 6G7. The inputs of AND-circuit 6G7 are connected to the line BCB2 and the output of OR-circuit 6B2 whose inputs are connected to lines CS15 and CS22.

The second input of AND-circuit 6G1 which generates the signal on line C"=" is connected to the equal generator LEG which satisfies the logic equaton:
$$LEG = CS\phi + CS7 + CS2 + CS24 + CS15A + CS13 + CS20.$$

The second input of AND-circuit 6G2 which generates the signal C"÷" is connected to the output of the divide generator DVG which satisfies the following logic equation:
$$DVG = CS6 + CS12 + CS19 + [MX' \cdot (CS23 + [BCB7 \cdot CS15])]$$

The second input of AND-circuit 6G3 which generates the signal C"×" is connected to the output of the multiply generator MUG which satisfies the following logic equation:

$$MUG = CS1 + [MX \cdot (CS23 + [BCB7 \cdot CS15])]$$

The second input of AND-circuit 6G4 which generates the signal C"+" is connected to the output of the add generator ADG which satisfies the following logic equation:

$$ADG = [CS22 \cdot BCB7 \cdot ([NORMAL \cdot D1Q'] + [NORMAL' \cdot D1Q])] + [CS15 \cdot BCB2 \cdot ([NORMAL \cdot D1Q] + [NORMAL' \cdot D1Q'])] + [CS22 \cdot BCB2 \cdot ([NORMAL' \cdot DQ2] \mp [NORMAL \cdot D2Q'])]$$

The second input of AND-circuit 6G5 which generates the C"−" signal is connected to the output of subtract generator SUG which satisfies the following logic equation:

$$SUG = [CS5] + [CS11] + [CS18] + [CS15 \cdot BCB2 \cdot ([NORMAL' \cdot D1Q] + [NORMAL \cdot D1Q'])] + [CS22 \cdot BCB7 \cdot ([NORMAL \cdot D1Q] + [NORMAL' \cdot DQ'])] + [CS22 \cdot BCB2 \cdot ([NORMAL \cdot D2Q] + [NORMAL' \cdot D2Q'])]$$

The signals D1Q and D1Q' are generated by D-flip-flop 6F1 whose D-input is connected to line NEG and whose CP-input is connected to the output of AND-circuit 6G8 having inputs connected to lines CS14 and BCB7 and the output of OR-circuit 6BC whose inputs are connected to lines CLϕ and LC180.

The signals D2Q and D2Q' are generated by D-flip-flop 6F2 whose D-input is connected to line NEG and whose CP-input is connected to the output of AND-circuit 6G9 having inputs connected to lines CS21 and BCB7 and the output of OR-circuit 6B4 which receives the CLϕ and CL180 signals.

The working registers WKR shown in FIG. 7 comprise three identical portions called the W portion WP which stores the $W_T$-numbers, the Y-portion YP which stores the $Y_T$-number and the K-portion KP which stores the K-number. The portions are identical in the sense that they comprise four sets of four flip-flops wherein each set stores one BCD digit received from lines R11–R18 and R21–R28 and transmits these digits onto lines 1B–8B, under control of load and unload logic units. With this in mind only the W portion WP will be described in detail.

The W portion WP comprises the sets W6, W5, W4 and W3 of four flip-flops wherein the inputs of the sets W6 and W4 are connected to lines R21–R28 and the inputs of the sets W5 and W3 are connected to lines R11–R28, and the outputs of all flip-flops are connected to lines 1B–8B.

The set W6 of flip-flops receives the number on lines R21–R28 when the logic unit LW6 feeds a signal into its logic input L. Similarly for the sets W5, W4 and W3 of flip-flops whose inputs are controlled by logic units LW5, LW4 and LW3, respectively. A typical logic unit LWN where N = 4 or 6 satisfies the logic equation:

$$LWN = CL180 \cdot BCB7 \cdot CS14.$$

When N = 3 or 5 the equation is:

$$LWN = CL\phi \cdot BCB7 \cdot CS14.$$

The set W6 of flip-flops transit its contents to lines 1B – 8B when there is a signal rom logic unit UW6 into its unload input U. Similarly, for the sets W5, W4 and W3 of flip-flops whose inputs are controlled by logic units UW5, UW4 and UW3, respectively.

The logic units UWN satisfying the following logic equations:

$$UW6 = S \cdot BCB3 \cdot CL180;$$

$$UW4 = S \cdot BCB5 \cdot CL180$$

$$UW5 = S \cdot BCB4 \cdot CL180;$$

$$UW3 = S \cdot BCB6 \cdot CL180$$

where $S = (CS15 + CS23)$

The logic units LY6, LY5, LY4 and LY3 for controlling the loading the sets Y6, Y5, Y4 and Y3 of flip-flops for the Y portion YP satisfy the logic equations:

$$LYN = CL180 \cdot BCB7 \cdot C21$$

when N = 6 or 4;

$$LYN = CL\phi \cdot BCB7 \cdot C21$$

when N = 5 or 3. The logic units UY6, UY5, UY4 and UY3 for controlling the unloading the sets Y6, Y5, Y4 and Y3, respectively, satisfy the following logic equations:

$$UY6 = S \cdot BCB3;$$

$$UY4 = S \cdot BCB5$$

$$UY5 = S \cdot BCB4;$$

$$UY3 = S \cdot BCB6$$

where $S = CS22 \cdot CL180$.

The logic units LK6, LK5, LK4 and LK3 for controlling the loading of the sets K6, K5, K4 and K3 of flip-flops in the K portion KP satisfy the following logic equations: $LKN = CS18 \cdot CL180 \cdot BCB7$ when N = 6 or 4; and $LKN = CS18 \cdot CL\phi \cdot BCB7$ when N = 5 or 3. The logic units UK6, UK5, UK4 and UK3 for controlling the unloading the sets K6, K5, K4 and K3, respectively satisfy the following logic equations:

$$UK6 = S \cdot CL180 \cdot BCB1$$

$$UK4 = S \cdot CL180 \cdot BCB3$$

$$UK5 = S \cdot CL180 \cdot BCB2$$

$$UK3 = S \cdot CL180 \cdot BCB5$$

wherein $S = (CS20 + CS13)$

The constant generator CG which generates and transmits the value 0.016 to the calculator CAL is shown in FIG. 8 having a set-reset flip-flop whose S-input receives the signals S1 to set the flip-flop and start generating the signal on line CGD. This signal is fed to the first input of each of the AND-circuits 8G1 to 8G4 whose second inputs receive the signal on line CL180. The third input of AND-circuit 8G1 receives the signal on the line BCB1 and its output transmits a signal on lines DPB. The third input of AND-circuit 8G2 receives the signal of line BCB2 and its output transmits a signal on line ODP. The third input of AND-circuit 8G3 receives a signal of line BCB3 and its output transmits a signal on line 1B and 1DP. The third input of AND-circuit 8G4 receives a signal on line BCB4 and its output transmits a signal on lines 2B and 4B.

The D-registers shown in FIG. 9 center around the five cascaded decade counters D1 to D5 which are all cleared by a signal at the output of OR-circuit 9B1 upon receipt of any one of the signals CS$\phi$, CS3, CS9, CS16 and CS25. The register counts the pulses received from probe unit PRB on line FO. Note the unit DO merely generates the equivalent of zero so in effect the contents of the registers are multiplied by ten. The outputs of the unit DO and counters D1 to D5 are connected to sets GDO to DG5 of four gates which control the transfer of the digits to the lines 1B – 8B. Each gate has three inputs, one connected to line CL180, one connected to line UD, and one connected to one of the BCBN lines. Logic unit LUD satisfies the following logic equation:

$$UD = CS2 + CS19 + CS12 + (CS5 \cdot NORMAL) + (CS6 \cdot NORMAL').$$

The D-register also generates the signals for line OB by means of zero generator OGEN which has circuitry for satisfying the following logic equation:

$$OB = [CBUS \cdot CL180 \cdot BCB] + [DBUS \cdot CL180 \cdot BCB] + [ODP] + [1DP] [[(CS15A+CS24) \cdot$$
$$CL180] \cdot [BCB1+BCB3+BCB4+BCB5+BCB6]]$$
$$[[T1 \cdot CL180] \cdot [BCB1BCB2+BCB3+BCB5]] +$$
$$[[T2 \cdot CL180] \cdot [BCB1+BCB2+BCB3+BCB4]]$$
$$+ [[CS22 \cdot CL180] \cdot$$
$$[BCB1+BCB2+BCB3+BCB4]]$$

where;
$BCB = (BCB1 + BCB2 + BCB3 + BCB4 + BCB5 + BCB6)$
$T1 = (CS20 + CS13)$
$T2 = (CS15 + CS23)$
$CBUS = CS18 + CS11 + (CS6 \cdot NORMAL) + (CS5 \cdot NORMAL')$
$DBUS = CS2 + CS19 + CS12 + (CS6 \cdot NORMAL') + (CS5 \cdot NORMAL)$ FIG. 10 shows the C-register CRG which centers around six sets C1 to C6 of four flip-flops having inputs connected to lines 1B–8B and outputs also connected to lines 1B to 8B. A typical set C1 of flip-flops receives the four bits on the lines 1B–8B when a control signal from logic unit LC1 is present at the load input L and transmits the four bits stored in the flip-flops onto lines 1B–8B in response to a signal from logic unit UC1 fed to its unload input U.

Each of the logic units LC1 to LC6 has circuitry to satisfy the following logic equation $$LCN = CS2 \cdot STP$$

A typical logic unit UCN when N = 1, 2, 3, 4, 5 and 6 has circuitry to satisfy the following logic equation:

$$UCN = CL180 \cdot BCBN \cdot [CS18+CS11+(CS5 \cdot NORMAL')+(CS6 \cdot NORMAL)]$$

Figure 11:
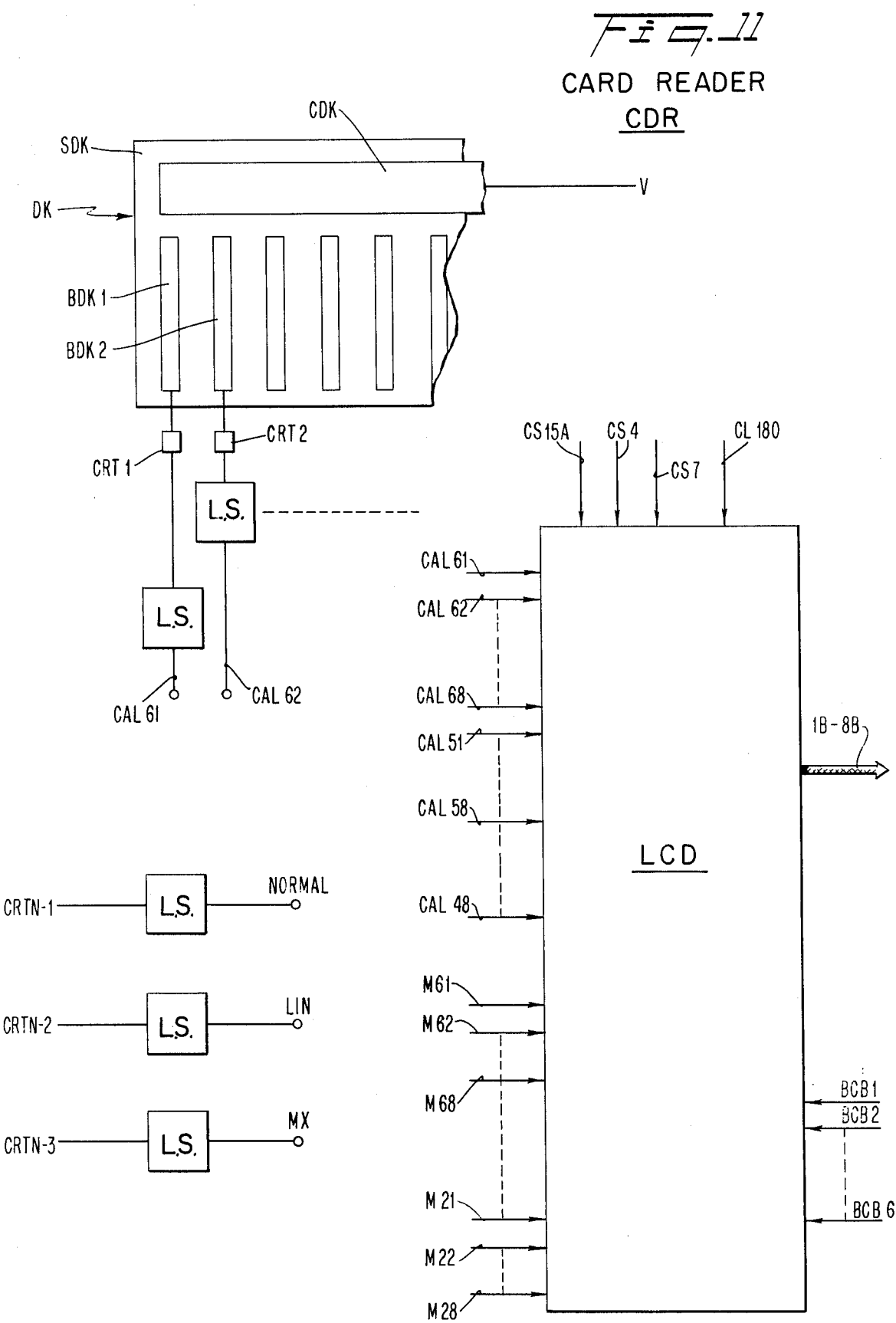
FIG. 11 is a block diagram of the card reader CDR.

The card reader CDR shown in FIG. 11 reads numbers and control indicators from the data card DK which can take many forms. An advantage configuration is a printed circuit card having a substrate SDK upon which is printed a common bus CDK connected to a voltage source V. Radiating from the bus CDK are bit conductors such as BDK1 and BDK2. It will be noted that a printed bridge still connects conductor BDK2 to the common bus. Therefore, it can be said that the bit conductor BDK2 stores and transmits a binary "1" or logic high. It will be noted that a printed bridge has been removed between conductor BDK1 and the common. Therefore, it can be said that the bit conductor BDK1 stores and transmits binary "0" or low logic.

Terminals CRTN in the card reader CDR connect the bit conductors to level shifters which produce signals having levels compatible with the rest of the processing unit PU.

The level shifters transmit signals related to the following information:

The signals on lines CAL61, CAL62, CAL64, CAL68, CAL51, CAL52, . . . , CAL58, CAL41, . . . , and CAL48 represent a three decimal digit constant unique to the standard being used in the measurement. The signals on line M68, M64, . . . , M61, M58, . . . , M51, M48, . . . , M41 represent a correction multiplier unique to the metal combination of the standard.

The signal on line MX indicates whether the correction is to be multiplied or divided. The signal on line NORMAL indicates whether a metal combination has a positive or negative thickness coefficient. The signal on line LIN indicates whether the correction is linear or non-linear.

The multiplier and the constant are processed by logic unit LCD to present them onto the lines 1B–8B. The unit includes circuitry which accomplishes the following logic equation:

$$NB = (CAL6N \cdot C6) + (CAL5N \cdot C5) + (CAL4N \cdot C4) + (M6N \cdot M6)(M5N \cdot M5) + (M4N \cdot M4) + (M3N \cdot M3) + (M3N \cdot M2);$$

where
 $N = 2, 3, 4,$ and 8;
and
 $C6 = CL180 \cdot BCB1 \cdot CS7;$
 $C5 = CL180 \cdot BCB2 \cdot CS7;$
 $C4 = CL180 \cdot BCB3 \cdot CS7;$
 $M6 = CL180 \cdot BCB1 \cdot (CS15A \cdot CS24)$
 $M5 = CL180 \cdot BCB3 \cdot (CS15A \cdot CS24)$
 $M4 = CL180 \cdot BCB4 \cdot (CS15A \cdot CS24)$
 $M3 = CL180 \cdot BCB5 \cdot (CS15A \cdot CS24)$
 $M2 = CL180 \cdot BCB6 \cdot (CS15A \cdot CS24)$ The display DLY shown in FIG. 12 takes the four-binary coded decimal digits on lines C48, ... C41, C38, ..., C11 and converts them under control of signal CS25 in four decoders 10DK, one per digit, to signals on one-out-of-ten lines MSD9, ..., LSDO each representing a decimal digit. The decimal signals are fed to numeric display device NDD which can be a four digit LED-or-NIXIE tube display.

In addition, a $CS\phi$ signal will energize amplifier LD1 to light zero light LZ, the CS3 signal will energize amplifier LD2 to light the check point light LC; the CS9 signal will energize amplifier LD3 to light the base light LB, and either the CS16 or CS25 signal will energize the amplifier LD4 to light the measure light LM.

The ROM input register RIG shown in FIG. 13 comprises four switch units RSW1 to RSW4 to positionally place shift the four digits arriving from the calculator CAL on line C11, ... , C18, ... , C44, and C48 in accordance with the position of the decimal point as indicated by the signals on lines CDP1, CDP2 and CDP3, and presents the realigned digits on lines RI1 to RI16.

The switch unit RSW1 associated with the most significant digit has circuitry which realizes the following logic equation:

$$RI1 = (S4 \cdot C48) + (S3 \cdot C38)$$

$$RI2 = (S4 \cdot C44) + (S3 \cdot C34)$$

$$RI3 = (S4 \cdot C42) + (S3 \cdot C32)$$

$$RI4 = (S4 \cdot C41) + (S3 \cdot C31)$$

The switch unit RSW2 which is associated with the next most significant digit has circuitry which satisfies the following logic equations:

$$RI5 = (S4 \cdot C38) + (S3 \cdot C28) + (S2 \cdot 48)$$

$$RI6 = (S4 \cdot C34) + (S3 \cdot C24) + (S2 \cdot 44)$$

$$RI7 = (S4 \cdot C32) + (S3 \cdot C22) + (S2 \cdot 42)$$

$$RI8 = (S4 \cdot C31) + (S3 \cdot C21) + (S2 \cdot 41)$$

The switch unit RSW3 which is associated with the next least significant digit has circuitry which satisfies the following logic equations:

$$RI9 = (S4 \cdot C28) + (S3 \cdot C18) + (S2 \cdot C48) + (S1 \cdot C38)$$

$$RI10 = (S4 \cdot C24) + (S3 \cdot C14) + (S2 \cdot C44) + (S1 \cdot C34)$$

$$RI11 = (S4 \cdot C22) + (S3 \cdot C12) + (S2 \cdot C42) + (S1 \cdot C32)$$

$$RI12 = (S4 \cdot C21) + (S3 \cdot C11) + (S2 \cdot C41) + (S1 \cdot C31)$$

The switch unit RSW4 is associated with the least significant digit and has circuitry which satisfies the following logic equations:

$$RI13 = (S4 \cdot C18) + (S2 \cdot C18) + (S1 \cdot C38)$$

$$RI14 = (S4 \cdot C14) + (S2 \cdot C24) + (S1 \cdot C34)$$

$$RI15 = (S4 \cdot C12) + (S2 \cdot C22) + (S1 \cdot C32)$$

$$RI16 = (S4 \cdot C11) + (S2 \cdot C21) + (S1 \cdot C31)$$

The signals S4, S3, S2 and S1 are generated by logic unit LRA which has circuitry satisfying the following logic equations:

$$S4 = A \cdot B; S3 = S' \cdot B; S2 = A \cdot B'; S4 = A' \cdot B'$$

where;

$$A = [CDP3 \cdot (CS21 + CS14)] + [CDP3 \cdot CS8] + [CDP2 \cdot (CS21 + CS14)] + [CDP2 \cdot CS8];$$

and $$B = [CDP2 \cdot (CS21 + CS14)] + [CDP2 \cdot CS8] + [CDP1 \cdot NEG \cdot (CS21 + CS14)]$$

Figure 14:
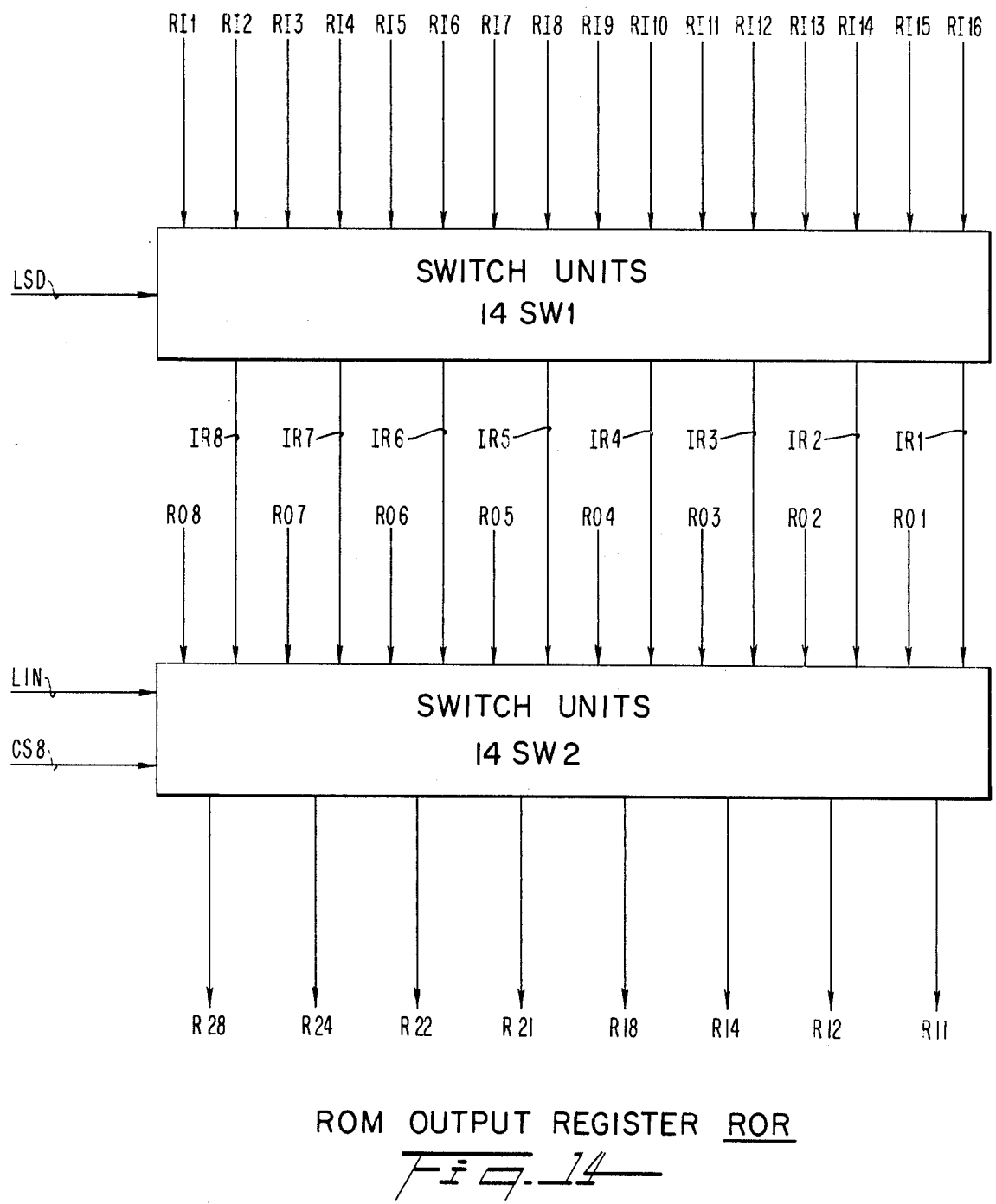
FIG. 14 is a block diagram of the ROM output register ROR.

The ROM output register ROR shown in FIG. 14 comprises two sets of switch units 14SW1 and 14SW2. The first switch unit 14SW1 is under control of the signal LSD and is associated with the multiplexing of the digits being transferred and comprises eight identical switches wherein each switch realizes the following logic equation:

$$RIN = (SLD' \cdot RI2 \times N) + (LSD \cdot RIN)$$

where
 $N = 1, 2, 3, \ldots, 8,$
and
 $2 \times N = 2 \times 1, 2 \times 2, \ldots, 2 \times 8 = 2, 4, \ldots, 16$ The second switch unit 14SW2 is under control of the signals on lines LIN and CS8 to select digits from the memory ROM or from the input register RIG and has eight identical switches.

The switches realize the following logic equation:

$$R28 = [(LIN \cdot CS8) \cdot IR8] + [(LIN \cdot CS8)' \cdot RO8]$$

$$R24 = [(LIN \cdot CS8) \cdot IR7] + [(LIN \cdot CS8)' \cdot RO7]$$

$$R22 = [(LIN \cdot CS8) \cdot IR6] + [(LIN \cdot CS8)' \cdot RO6]$$

$$R21 = [(LIN \cdot CS8) \cdot IR5] + [(LIN \cdot CS8)' \cdot R)5]$$

$$R18 = [(LIN \cdot CS8) \cdot IR4] + [(LIN \cdot CS8)' \cdot RO4]$$

$$R14 = [(LIN \cdot CS8) \cdot IR3] + [(LIN \cdot CS8)' \cdot RO3]$$

$$R12 = [(LIN \cdot CS8) \cdot IR2] + [(LIN \cdot CS8)' \cdot RO2]$$

$$R11 = [(LIN \cdot CS8) \cdot IR1] + [(LIN \cdot CS8)' \cdot RO1]$$

Figure 15:
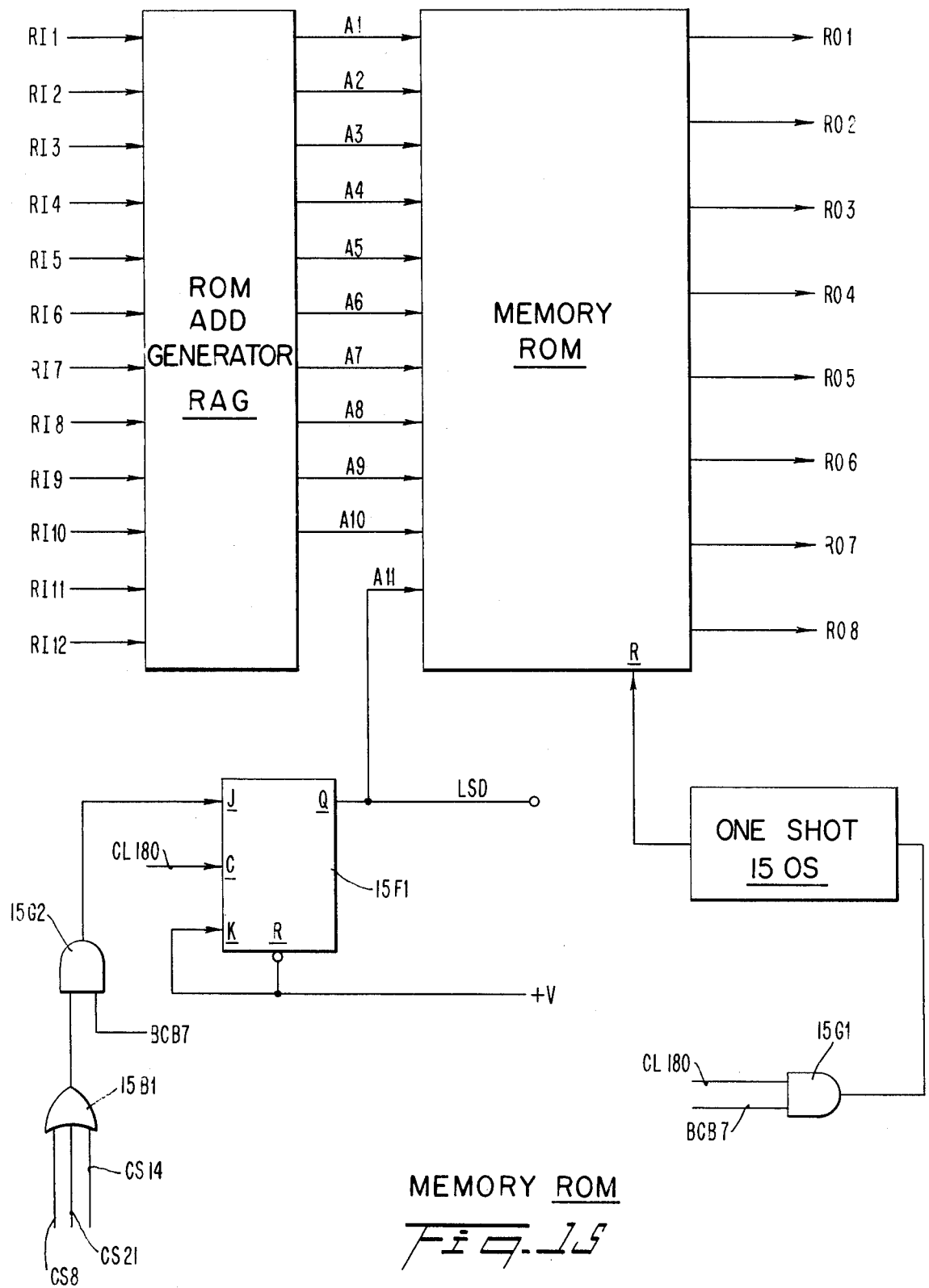
FIG. 15 is a block diagram of the memory ROM and the ROM address generator RAG.

The memory shown in FIG. 15 centers around a read only memory ROM having 2048 eight-bit registers. However, since the digits used throughout the system are binary coded decimal requiring only four bits per digit, each register stores two digits which are read out in multiplex fashion under control of flip-flop 15F1. The desired register is selected by the address generator RAG which converts the decimal digits on lines RI1 to RI12 to a full binary number fed via lines A1 to A10 to the register select circuitry of memory ROM. The memory ROM is constantly read by periodically recurring pulses from one shot 150S which is triggered by the coincidence of the signals of lines CL180 and BCB7 fed to inputs of AND-circuits 15G1 whose output is connected to the trigger input I of the one shot.

The selection of which half of the register is to be read out is accomplished by flip-flop 15F1 such that when its Q-output is high the least significant half of the register is read and when Q-output is low the most significant half is read. The flip-flop 15F1 is of the J-K type whose K input is always high and which is clocked by signals on line CL180. As long as the J-input is low than the Q-output is low. When the J-input is high the flip-flop will toggle and the Q-output will go high for on pulse of line CL180. The J-input is connected to the output of AND-circuit 15G2 having one input connected to line BCB7 and another input connected to the outputs of OR-circuit BCB7 having inputs connected to lines CS8, CS21 and CS14. Thus, memory ROM is usually transmitting the most significant digit of the set. The at the BCB7 time of states CS8, 21 and 24 it reads out the least significant digit in addition to the most.

The probe unit PRB is shown in FIG. 16 comprising primarily: a pulse former PF which amplifies and shapes the pulses received on line GP in response to Beta particle detection; a binary divider 16BDV which can be a seven stage binary counter chain; a time interval selector TIS whose inputs are primarily time selector switches; a selector switch 15SS1 which transfers the signals on one of the lines PCN to the single output connected to line FO in response to a signal on a corresponding one of the lines GN; a comparator EQL which compares for equality between the signals on lines GN and signals on lines BCN; and an oscillator driven binary counter BC whose stages have outputs connected to lines BC8, BC4, BC2, BC1, BC/2, BC/4, BC/8 and BC/16.

In operation a user selects a desired measuring interval by closing one of the switches NMSS where N indicates the time interval in minutes. During calibrate routines which occur during the states CS1, CS10 and CS17 this time interval is, internal to timer interval selector TIS, multiplied by four. For actual measurements of unknown items which occurs during state CS17 there is no multiplication. In either case timer interval selector TIS generates a signal on one of the lines GN which is fed to selector switch 15SS1. Now at the occurrence of a signal on any one of the lines CS1, CS4, CS10 or CS17 a signal is fed from the output of OR-circuit 16B1 which clears binary counter chain BC causing the output of the equality comparator EQL to go low because all of its BCN outputs are low or zero and one of the GN signal lines is high, i.e., the one associated with the selected time interval. Hence, the output of AND-circuit 16G3 connected to line TG' goes high opening AND-circuit 16G1. The pulses in response to the Betaparticles are fed from pulse former PF to divider 16BDV. Note each of the lines PCN transmits pulses at 1/N times the rate at which the pulses are emitted from pulse former PF. The selector switch 15SS1 is so connected that the pulses emitted on line FO always equals the number of Beta-particles emitted in 1/16 of a minute. Therefore, if a time interval of one minute is chosen by activating switch 1MSS resulting in a signal on line G1, then in effect line PC/16 (which carries pulses at 1/16 the rate of the pulse former) is connected to line FO. At the same time the signal on line G1 is fed to one side of comparator EQL.

Oscillator 160SC and the binary counter chain BC are so chosen that the outputs of its stages go high at time intervals that correspond to the time intervals of time interval selector TIS. (Thus, for example output BC4 goes high after four minutes). For the present example, with a signal on line G1 indicating a one minute time interval, the output BC1 will go high one minute after the counter chain BC was cleared to zero.

At that time the output of the comparator EQL goes high. This high signal fed to the inverting input of AND-circuit 16G2 stops the passage of pulses to the count input of binary counter chain BC. The high signal also causes the inverting output of AND-circuit 16G3 to go low closing AND-circuit 16G1 and indicating the end of a timing or pulse counting cycle.

The time interval selector TIS has circuits which satisfy the following logic equations:

$$G8 = [2MSS \cdot (CS1 + CS4 + CS10)]$$

$$G4 = [1MSS \cdot (CS1 + CS4 + CS10)]$$

$$G2 = [2MSS \cdot CS17] + [\tfrac{1}{2}MSS \cdot (CS1 + CS4 + CS10)]$$

$$G1 = [1MSS \cdot CS17] + [\tfrac{1}{4}MSS \cdot (CS1 + CS4 + CS10)]$$

$$G/2 = [\tfrac{1}{2}MSS \cdot CS17] + [\tfrac{1}{8} MSS \cdot (CS1 + CS4 + CS10)]$$

$$G/4 = [\tfrac{1}{4}MSS \cdot CS17] + [1/16\,MSS \cdot (CS1 + CS4 + CS10)]$$

$$G/8 = [\tfrac{1}{8} MSS \cdot CS17]$$

$$G/16 = [1/16\,MSS \cdot CS17]$$

The selector switch 15SS1 has circuits which satisfy the following logic equations:

$$FO = (PC1 \cdot G/16) + (PC/2 \cdot G/8) + (PC/4 \cdot G/4) + (PC/8 \cdot G/2) + (PC/16 \cdot G1) + (PC/32 \cdot G2) + (PC/64 \cdot G4) + (PC/128 \cdot G8)$$

Having thus described my invention, I claim:

1. In a beta particle backscatter instrument for nondestructively measuring the thickness of a coating on a substrate by counting beta particle radiation backscattered therefrom comprising:
   means for counting beta particle radiation backscattered from a coated substrate;
   memory means for storing data representative of a universal curve describing a relationship between calibration number and multiplied thickness corresponding to a composite relationship of a multiplicity of curves of beta particle backscatter count versus coating thickness for selectable combinations of isotope source, substrate material and coating material;

a control card for a particular combination of isotope source, substrate material and coating material incorporating calibration idicia for determining a calibration number for the beta particle backscatter count and multiplier indicia for determining coating thickness for a particular multiplied thickness;

means conditioned by the calibration indicia incorporated in the control card to convert particle backscatter count to a corresponding calibration number;

means for determining the multiplied thickness corresponding to such calibration number from the universal curve; and means conditioned by the multiplier indicia incorporated in the control card to convert such multiplied thickness to indicia of coating thickness.

2. The combination, according to claim 1, wherein the indicia on the control card comprise interruptable strips of conductive material.

* * * * *

UNITED STATES PATENT OFFICE
CERTIFICATE OF CORRECTION

Patent No. 4,079,237　　　　　　　Dated March 14, 1978

Inventor(s) Julius Schlesinger

It is certified that error appears in the above-identified patent and that said Letters Patent are hereby corrected as shown below:

Col. 11, line 17　change "generates" to -- generate --; and line 55　change "$\overline{+}$" to -- + --;

Col. 12, line 41　change "transit" to -- transmit --; and line 42　change "rom" to -- from --;

Col. 16, line 15　change "C18" (second occurrence)

to -- C28 --; and line 45　change "SLD'" to -- LSD' --;

Col. 18, line 6　change "Beta-particles" to -- Betaparticles --

Signed and Sealed this

Seventeenth Day of October 1978

[SEAL]

Attest:

RUTH C. MASON
*Attesting Officer*

DONALD W. BANNER
*Commissioner of Patents and Trademarks*